(12) United States Patent
Fuchie

(10) Patent No.: US 7,539,347 B2
(45) Date of Patent: May 26, 2009

(54) INFORMATION PROCESSING APPARATUS AND INFORMATION PROCESSING METHOD, RECORDING MEDIUM, AND PROGRAM

(75) Inventor: Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 11/207,899

(22) Filed: Aug. 22, 2005

(65) Prior Publication Data
US 2006/0045467 A1 Mar. 2, 2006

(30) Foreign Application Priority Data
Aug. 25, 2004 (JP) ............................ P2004-245373

(51) Int. Cl.
*G06K 9/36* (2006.01)
(52) U.S. Cl. ..................................... 382/236
(58) Field of Classification Search ................ 345/130; 348/14.13, E7.046; 370/395.64; 375/240.25, 375/E7.026, E7.027, E7.028, E7.029, E7.03, 375/E7.031, E7.032, E7.033, E7.034, E7.035, 375/E7.036, E7.037, E7.038, E7.087, E7.098, 375/E7.138, E7.187, E7.211; 380/217; 382/166, 382/232, 233, 234, 235, 236, 238, 284; 386/4, 386/27, 33, 52, 109, 110, 111, 112; 399/182, 399/187; 715/723, 178
See application file for complete search history.

(56) References Cited

U.S. PATENT DOCUMENTS 7,096,488 B1 * 8/2006 Zhang et al. ................ 725/105

7,113,542 B2 * 9/2006 Tanaka ................... 375/240.01

FOREIGN PATENT DOCUMENTS

| JP | 10-112840 | 4/1998 |
|---|---|---|
| JP | 11-289541 | 10/1999 |

OTHER PUBLICATIONS

U.S. Appl. No. 11/207,826, filed Aug. 22, 2005, Fuchie.
U.S. Appl. No. 11/207,899, filed Aug. 22, 2005, Fuchie.

* cited by examiner

*Primary Examiner*—Matthew C Bella
*Assistant Examiner*—Gregory F Cunningham
(74) *Attorney, Agent, or Firm*—Oblon, Spivak, McClelland, Maier & Neustadt, P.C.

(57) ABSTRACT

An information processing apparatus and method are disclosed by which data of the Open GOP structure can be edited while observing restrictions to a VBV Buffer. First and second sections including first and second editing points set to first and second compressed image data are decoded to produce first and second image data, respectively. The first and second image data are spliced together at the editing points and then re-encoded to produce re-encoded image data. Thereupon, the picture type of those pictures in the re-encoded image data which are positioned later in time in a display order than an I or P picture is not made different from that of pictures of the first and second compressed image data. Then, the first and second compressed image data and the re-encoded image data are switchably outputted to produce edited compressed image data.

14 Claims, 17 Drawing Sheets

INFORMATION PROCESSING APPARATUS AND INFORMATION PROCESSING METHOD, RECORDING MEDIUM, AND PROGRAM

CROSS REFERENCES TO RELATED APPLICATIONS

The present invention contains subject matter related to Japanese Patent Application JP 2004-245373 filed in the Japanese Patent Office on Aug. 25, 2004, the entire contents of which being incorporated herein by reference.

BACKGROUND OF THE INVENTION

This invention relates to an information processing apparatus and an information processing method, a recording medium, and a program, and more particularly to an information processing apparatus and an information processing method, a recording medium, and a program suitable for use where video data compressed bidirectional interframe prediction are edited.

Image compression methods represented by an MPEG (Moving Picture Coding Experts Group/Moving Picture Experts Group) method achieve a high compression efficiency by compression encoding an image signal using interframe prediction. However, where it is intended to edit images, since compressed image materials formed using interframe prediction cannot be spliced together while they remain in the form of a compressed image signal because they have a relationship of compressed signals by prediction between frames. Therefore, a system which is configured taking it into consideration in advance to edit image materials usually performs encoding using only compression within a frame without using interframe prediction.

However, where an image signal of a high definition having a large information amount is handled like, for example, a high definition (HD) signal, if only interframe compression is used for encoding, then only a low compression efficiency is obtained. Therefore, in order to transmit or store a large amount of data, an expensive system is required in that a high transfer speed is required, a large storage capacity is required or a high processing speed is required. In other words, in order to allow an image signal of a high definition having a large amount of information to be handled by a less expensive system, it is necessary to use interframe prediction to assure high compression efficiency.

In the MPEG system, a compression coding system which uses bidirectional interframe prediction and involves I pictures, P pictures and B pictures is called compression of the Long GOP (Group of Pictures) system.

An I picture is an intraframe coded picture coded independently of any other picture, and an image can be decoded from information only of an I picture. A P picture is an interframe forward predictive coded picture represented by a difference from a preceding frame (in the forward direction) with respect to time. A B picture is a bidirectional predictive coded picture coded by motion compensation interframe prediction making use of preceding (in the forward direction), succeeding (in the reverse direction) or preceding and succeeding (in the opposite directions (bidirectional)) pictures with respect to time.

Since the P picture and the B picture have a smaller data amount than the I picture, if the GOP is made longer (that is, if the number of pictures which form a Long GOP is increased), then the compression ratio of the image can be raised. Therefore, the P picture and the B picture are suitable for utilization in digital broadcasting applications and DVD (Digital Versatile Disk) video applications. However, if the GOP is excessively long, then the editing control in the frame accuracy becomes difficult, and a problem in operation takes place in editing in business applications.

A process of splicing two image data compressed by the Long GOP method each other at predetermined editing points (splicing points) is described with reference to FIG. 1.

First, for each of editing object compressed image data 1 and editing object compressed image data 2, partial decoding of a portion in the proximity of an editing point is performed. Consequently, partial non-compressed image signal 1 and image signal 2 are obtained. Then, the non-compressed image signal 1 and image signal 2 are spliced each other at the editing points, and an effect is applied to the portion in the proximity of the editing point as occasion demands and then re-encoding is performed. Then, the re-encoded compressed image data is spliced with the compressed image data which have not undergone the decoding and re-encoding processes (compressed image data other than the portion for which the partial decoding is performed).

The method described above with reference to FIG. 1 is advantageous in that deterioration of the picture quality by re-encoding can be suppressed locally and the editing processing time can be reduced significantly when compared with those of an alternative method wherein all image data of compressed editing materials are decoded and then the image signals are connected to each other at the editing points, whereafter all of the image signals are re-encoded to obtain edited compressed video data.

However, if such a method as described above with reference to FIG. 1 is used to perform editing and re-encoding, then this gives rise to a problem that a picture cannot be referred to at a joint between a portion for which re-encoding is performed and another portion for which no re-encoding is performed.

The following method is known as a countermeasure for the problem described. In particular, where compression is performed using a method (Long GOP) which involves predictive encoding between frames, in order to implement editing comparatively and simply, the interframe prediction is limited so as to adopt a Closed GOP structure such that a picture is referred to only within a GOP but is not referred to across GOPs.

A case wherein limitation to interframe prediction is applied is described with reference to FIG. 2. FIG. 2 illustrates a list of pictures in a display order in regard to data of the compressed material image 1 and data of the compressed material image 2 of an object of editing, data of partially re-encoded data of compressed pictures in the proximity of the editing points after the editing and data of compressed images of a portion for which re-encoding is not performed in order to indicate a relationship between interframe prediction and editing. An arrow mark in FIG. 2 indicates a referencing direction of a picture (this similarly applies also to the other figures). In FIG. 2, 15 pictures of BBIBBPBBPBBPBBP of the display order form one GOP, and referencing to a picture is performed only within the GOP. This method inhibits prediction across GOPs thereby to eliminate the relationship of compressed data by prediction between GOPs thereby to allow re-splicing of compressed data in a unit of a GOP (determination of a range within which re-encoding is to be performed).

In particular, the range for re-encoding is determined in a unit of one GOP including an editing point for data of the compressed material image 1 and data of the compressed material image 2 which are an object of editing, and the data of the compressed material image 1 and the data of the compressed material image 2 which are an object of editing within the re-encoding ranges determined in a unit of one GOP are decoded to produce signals of the non-compressed material image 1 and the non-compressed material image 2. Then, the signal of the non-compressed material image 1 and the signal of the non-compressed material image 2 are spliced each other at the cut editing point, and the material image 1 and the material image 2 spliced together in this manner are partly re-encoded to produce compressed image data. Then, the compressed image data are spliced with the compressed video data of the portions which have not been re-encoded thereby to produce compressed edited image data.

Actually encoded data are arrayed in a coding order as illustrated in FIG. 3, and splicing of compressed image data is performed in the coding order. Referring to FIG. 3, the compressed image data produced by partially re-encoding the material image 1 and the material image 2 spliced together and the compressed image data which have not been re-encoded are spliced at a $B_{13}$ picture which is the last picture in the coding order in the data of the compressed material image 1 in the portion which has not been re-encoded and is the fourteenth picture in the display order and an $I_2$ picture which is the first picture in the coding order in the compressed image data produced by the re-encoding and is the third picture in the display order. Further, a $B_{12}$ picture which is the last picture in the coding order in the compressed image data produced by the re-encoding and is the thirteenth picture in the display order and the $I_2$ picture which is the first picture in the coding order in the data of the compressed material image 2 in the portion which has not been re-encoded and is the third picture in the display order are spliced each other. In other words, the compressed image data produced by re-encoding of the material image 1 and the material image 2 spliced together and the compressed image data in the portion which has not been re-encoded are connected at GOP changeover portions to produce compressed edited image data.

On the other hand, a GOP structure which does not have the Closed GOP structure, that is, a Long GOP structure where an image is referred to across GOPs, is called Open GOP.

Also a technique for splicing two bit streams of the Open GOP structure while preventing otherwise possible deterioration of the picture quality at splicing portions when bit streams of MPEG encoded pictures having the Open GOP structure are spliced together is available. When two bit streams of the Open GOP structure are edited, or more particularly when a bit stream Y is inserted into another bit stream X, a B picture preceding to an I picture which forms the first GOP of the bit stream Y (a B structure which appears before an I picture is displayed) is deleted and the temporal references of the remaining pictures which form the GOP are changed so that the B picture prior to the I picture which is predicted using a picture which forms the last GOP of the bit stream X may not be displayed to prevent such deterioration of the picture quality as described above. One of such techniques is disclosed, for example, in Japanese Patent Laid-Open No. Hei 10-66085 (hereinafter referred to as Patent Document 1).

SUMMARY OF THE INVENTION

However, according to the editing method wherein the Closed GOP structure wherein prediction across GOPs is inhibited as described hereinabove with reference to FIGS. 2 and 3 is utilized, limitation is applied to the prediction direction at a starting portion of a GOP. Consequently, the compression efficiency of an image signal is lower than that of the Open GOP structure of a compression method different from the Closed GOP structure which is used popularly.

On the other hand, the technique disclosed in Patent Document 1 has a problem in that, since a B picture at a splicing portion is not displayed, the picture misses as much.

There is a need for providing an information processing apparatus and an information processing method, a recording medium and a program by which editing of compressed image signals formed using bidirectional interframe prediction can be implemented while observing restrictions to a VBV Buffer.

In order to meet the need described above, according to an embodiment of the present invention, there is provided an information processing apparatus for splicing first compressed image data with second compressed image data, including decoding means for decoding a first predetermined section including a first editing point set to the first compressed image data to produce first image data and decoding a second predetermined section including a second editing point set to the second compressed image data to produce second image data, re-encoding means for splicing the first and second image data to each other at the first editing point and the second editing point and re-encoding the resulting image data to produce re-encoded image data, control means for controlling the re-encoding process of the re-encoding means so that the picture type of each of those pictures in the re-encoded image data produced by the re-encoding means which are positioned later in time in a display order than an I picture or a P picture is not made different from that of a corresponding one of pictures of the first compressed image data and the second compressed image data, and editing means for switchably outputting the first and second compressed image data and the re-encoded image data produced by the re-encoding means to produce edited compressed image data.

According to another embodiment of the present invention, there is provided an information processing method for splicing first compressed image data with second compressed image data, including the steps of decoding a first predetermined section including a first editing point set to the first compressed image data to produce first image data and decoding a second predetermined section including a second editing point set to the second compressed image data to produce second image data, splicing the first and second image data each other at the first editing point and the second editing point and re-encoding the resulting image data to produce re-encoded image data, controlling the re-encoding process at the re-encoding step so that the picture type of each of those pictures in the re-encoded image data produced at the re-encoding step which are positioned later in time in a display order than an I picture or a P picture is not made different from that of a corresponding one of pictures of the first compressed image data and the second compressed image data, and switchably outputting the first and second compressed image data and the re-encoded image data produced at the re-encoding step to produce edited compressed image data.

According to a further embodiment of the present invention, there is provided a program for causing a computer to execute a process of splicing first compressed image data with second compressed image data, including the steps of decoding a first predetermined section including a first editing point set to the first compressed image data to produce first image data and decoding a second predetermined section including a second editing point set to the second compressed image data to produce second image data, splicing the first and second image data each other at the first editing point and the second editing point and re-encoding the resulting image data to produce re-encoded image data, controlling the re-encoding process at the re-encoding step so that the picture type of each of those pictures in the re-encoded image data produced at the re-encoding step which are positioned later in time in a display order than an I picture or a P picture is not made different from that of a corresponding one of pictures of the first compressed image data and the second compressed image data, and switchably outputting the first and second compressed image data and the re-encoded image data produced at the re-encoding step to produce edited compressed image data.

According to a still further embodiment of the present invention, there is provided a recording medium on which a program for causing a computer to execute a process of splicing first compressed image data with second compressed image data is recorded, the program including the steps of decoding a first predetermined section including a first editing point set to the first compressed image data to produce first image data and decoding a second predetermined section including a second editing point set to the second compressed image data to produce second image data, splicing the first and second image data to each other at the first editing point and the second editing point and re-encoding the resulting image data to produce re-encoded image data, controlling the re-encoding process at the re-encoding step so that the picture type of each of those pictures in the re-encoded image data produced at the re-encoding step which are positioned later in time in a display order than an I picture or a P picture is not made different from that of a corresponding one of pictures of the first compressed image data and the second compressed image data, and switchably outputting the first and second compressed image data and the re-encoded image data produced at the re-encoding step to produce edited compressed image data.

In the information processing apparatus, information processing method, recording medium and program, a first predetermined section including a first editing point set to the first compressed image data is decoded to produce first image data, and a second predetermined section including a second editing point set to the second compressed image data is decoded to produce second image data. The first and second image data are spliced each other at the first editing point and the second editing point, and the resulting image data are re-encoded to produce re-encoded image data. The re-encoding process is controlled so that the picture type of each of those pictures in the re-encoded image data produced by the re-encoding which are positioned later in time in a display order than an I picture or a P picture is not made different from that of a corresponding one of pictures of the first compressed image data and the second compressed image data. Then, the first and second compressed image data and the re-encoded image data are switchably outputted to produce edited compressed image data.

With the information processing apparatus, information processing method, recording medium and program, the first compressed image data and the second compressed image data can be spliced together at the first and second editing points. Particularly, the first and second compressed data only in the first and second predetermined sections in the proximity of the first and second editing points are decoded and spliced together at the editing points such that the picture type of each of those pictures in the re-encoded image data produced at the re-encoding step which are positioned later in time in a display order than an I picture or a P picture is not made different from that of a corresponding one of pictures of the first compressed image data and the second compressed image data. Consequently, data compression coded in accordance with the Open GOP system can be edited without suffering from deterioration of the picture quality and also from break down of a VBV buffer.

According to a yet further embodiment of the present invention, there is provided an information processing apparatus for splicing first compressed image data with second compressed image data, including decoding means for decoding a first predetermined section including a first editing point set to the first compressed image data to produce first image data and decoding a second predetermined section including a second editing point set to the second compressed image data to produce second image data, re-encoding means for splicing the first and second image data to each other at the first editing point and the second editing point and re-encoding the resulting image data to produce re-encoded image data, and control means for controlling the re-encoding process of the re-encoding means so that the picture type of each of those pictures in the re-encoded image data produced by the re-encoding means which are positioned later in time in a display order than an I picture or a P picture is not made different from that of a corresponding one of pictures of the first compressed image data and the second compressed image data.

According to a yet further embodiment of the present invention, there is provided an information processing method for splicing first compressed image data with second compressed image data, including the steps decoding a first predetermined section including a first editing point set to the first compressed image data to produce first image data and decoding a second predetermined section including a second editing point set to the second compressed image data to produce second image data, splicing the first and second image data to each other at the first editing point and the second editing point and re-encoding the resulting image data to produce re-encoded image data, and controlling the re-encoding process at the re-encoding step so that the picture type of each of those pictures in the re-encoded image data produced at the re-encoding step which are positioned later in time in a display order than an I picture or a P picture is not made different from that of a corresponding one of pictures of the first compressed image data and the second compressed image data.

Also in the information processing apparatus and information processing method, a first predetermined section including a first editing point set to the first compressed image data is decoded to produce first image data, and a second predetermined section including a second editing point set to the second compressed image data is decoded to produce second image data. The first and second image data are spliced each other at the first editing point and the second editing point, and the resulting image data are re-encoded to produce re-encoded image data. The re-encoding process is controlled so that the picture type of each of those pictures in the re-encoded image data produced by the re-encoding which are positioned later in time in a display order than an I picture or a P picture is not made different from that of a corresponding one of pictures of the first compressed image data and the second compressed image data.

Also with the information processing apparatus and information processing method, the first compressed image data and the second compressed image data can be spliced together at the first and second editing points. Particularly, the first and second compressed data only in the first and second predetermined sections in the proximity of the first and second editing points are decoded and spliced together at the editing points such that the picture type of each of those pictures in the re-encoded image data produced at the re-encoding step which are positioned later in time in a display order than an I picture or a P picture is not made different from that of a corresponding one of pictures of the first compressed image data and the second compressed image data. Consequently, data compression coded in accordance with the Open GOP system can be edited without suffering from deterioration of the picture quality and also from break down of a VBV buffer.

According to a yet further embodiment of the present invention, there is provided an information processing apparatus for splicing first compressed image data with second compressed image data, including re-encoding means for splicing first image data obtained by decoding a first predetermined section including a first editing point set to the first compressed image data with second image data produced by decoding a second predetermined section including a second editing point set to the second compressed image data to each other at the first editing point and the second editing point and re-encoding the resulting image data to produce re-encoded image data, and control means for controlling the re-encoding process of the re-encoding means so that the picture type of each of those pictures in the re-encoded image data produced by the re-encoding means which are positioned later in time in a display order than an I picture or a P picture is not made different from that of a corresponding one of pictures of the first compressed image data and the second compressed image data.

According to a yet further embodiment of the present invention, there is provided an information processing method for splicing first compressed image data with second compressed image data, including the steps of splicing first image data obtained by decoding a first predetermined section including a first editing point set to the first compressed image data with second image data produced by decoding a second predetermined section including a second editing point set to the second compressed image data to each other at the first editing point and the second editing point and re-encoding the resulting image data to produce re-encoded image data, and controlling the re-encoding process at the re-encoding step so that the picture type of each of those pictures in the re-encoded image data produced at the re-encoding step which are positioned later in time in a display order than an I picture or a P picture is not made different from that of a corresponding one of pictures of the first compressed image data and the second compressed image data.

In the information processing apparatus and information processing method, first image data produced by decoding a first predetermined section including a first editing point set to first compressed image data and second image data produced by decoding a second predetermined section including a second editing point set to second compressed image data are spliced each other at the first editing point and the second editing point, and the resulting image data are re-encoded to produce re-encoded image data. The re-encoding process is controlled so that the picture type of each of those pictures in the re-encoded image data produced by the re-encoding which are positioned later in time in a display order than an I picture or a P picture is not made different from that of a corresponding one of pictures of the first compressed image data and the second compressed image data.

Also with the information processing apparatus and information processing method, the first compressed image data and the second compressed image data can be spliced together at the first and second editing points. Particularly, the first and second compressed data only in the first and second predetermined sections in the proximity of the first and second editing points are decoded and spliced together at the editing points such that the picture type of each of those pictures in the re-encoded image data produced at the re-encoding step which are positioned later in time in a display order than an I picture or a P picture is not made different from that of a corresponding one of pictures of the first compressed image data and the second compressed image data. Consequently, data compression coded in accordance with the Open GOP system can be edited without suffering from deterioration of the picture quality and also from break down of a VBV buffer.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

In the following, a preferred embodiment of the present invention is described with reference to the accompanying drawings.

Figure 1:
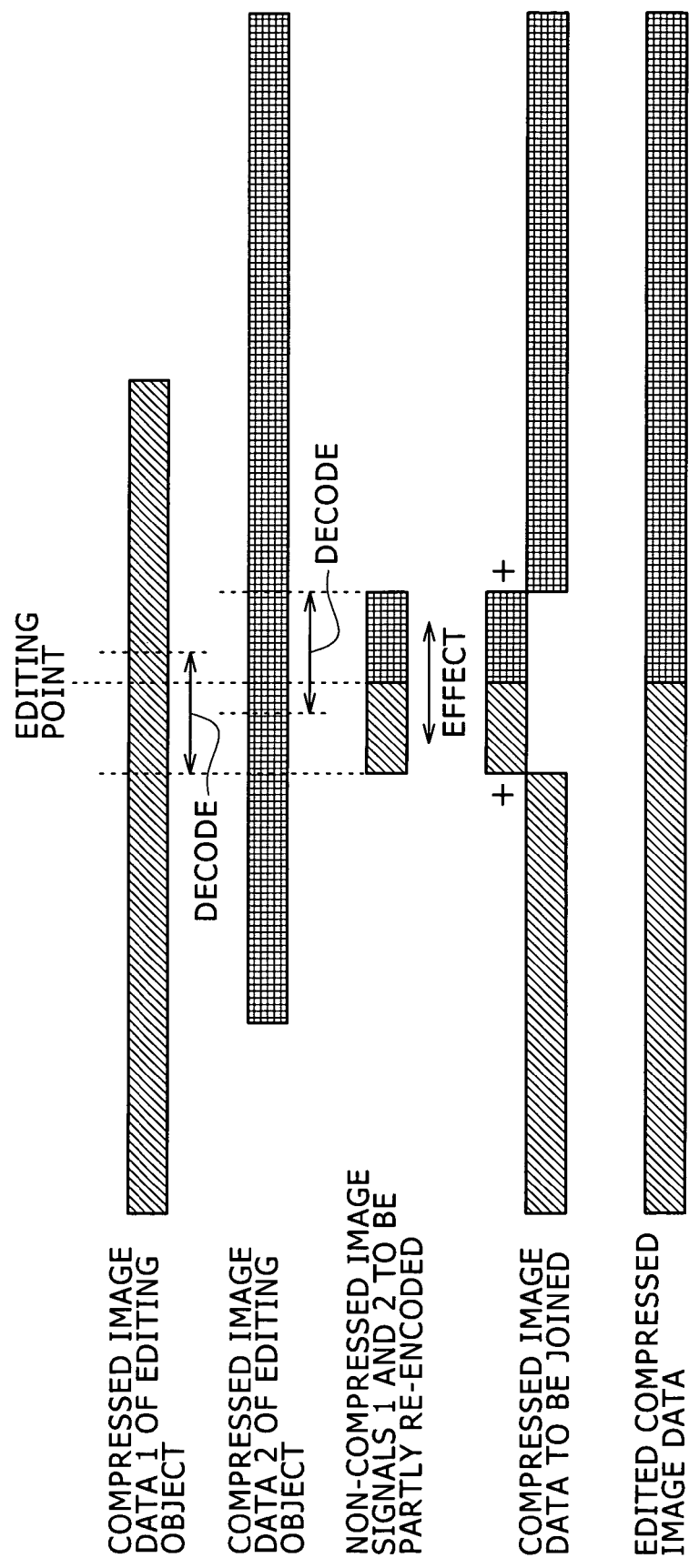
FIG. 1 is a diagrammatic view illustrating editing and partial re-encoding.
Figure 2:
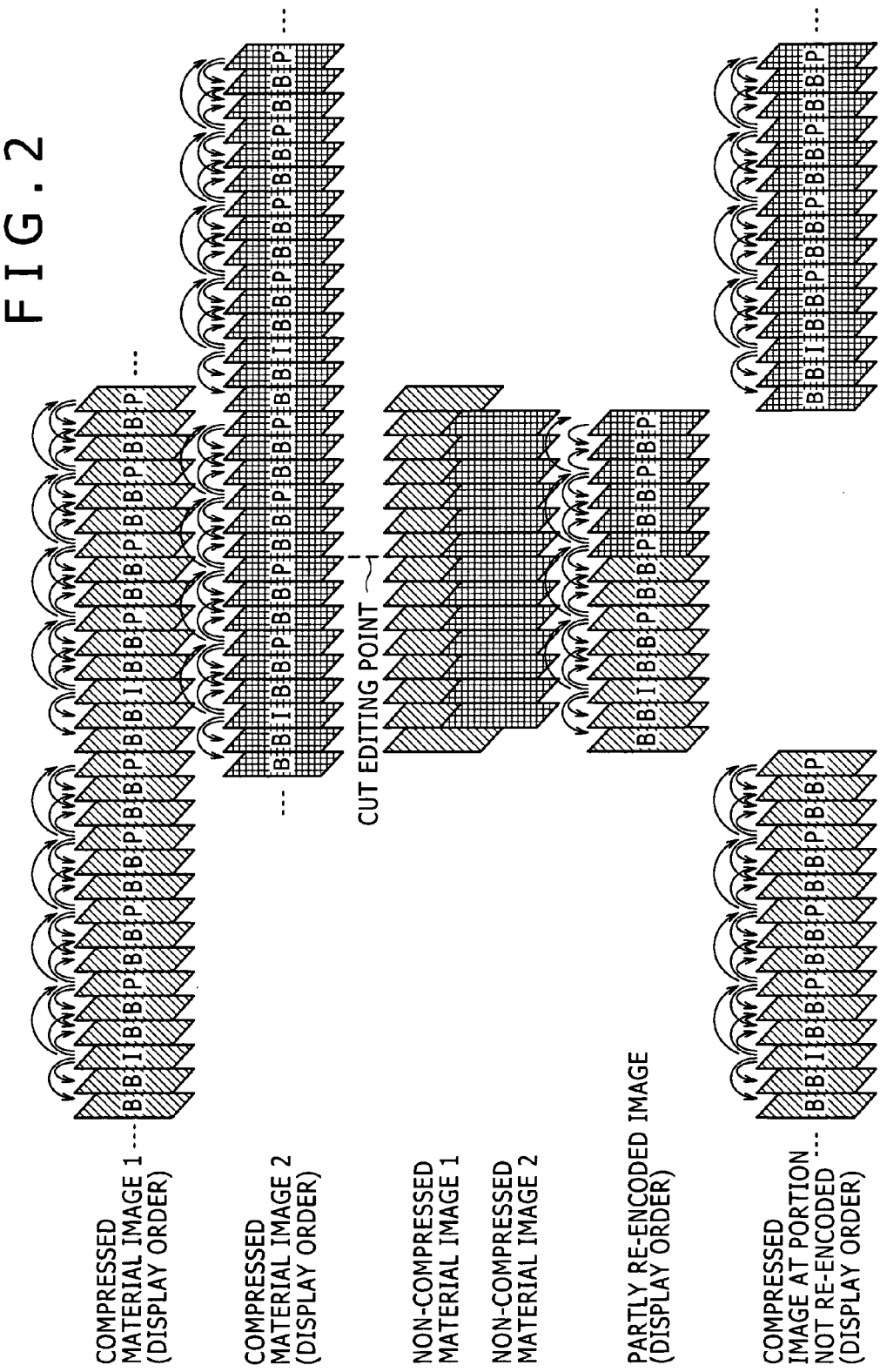
FIG. 2 is a diagrammatic view illustrating editing and partial re-encoding where the Closed GOP structure is used.
Figure 3:
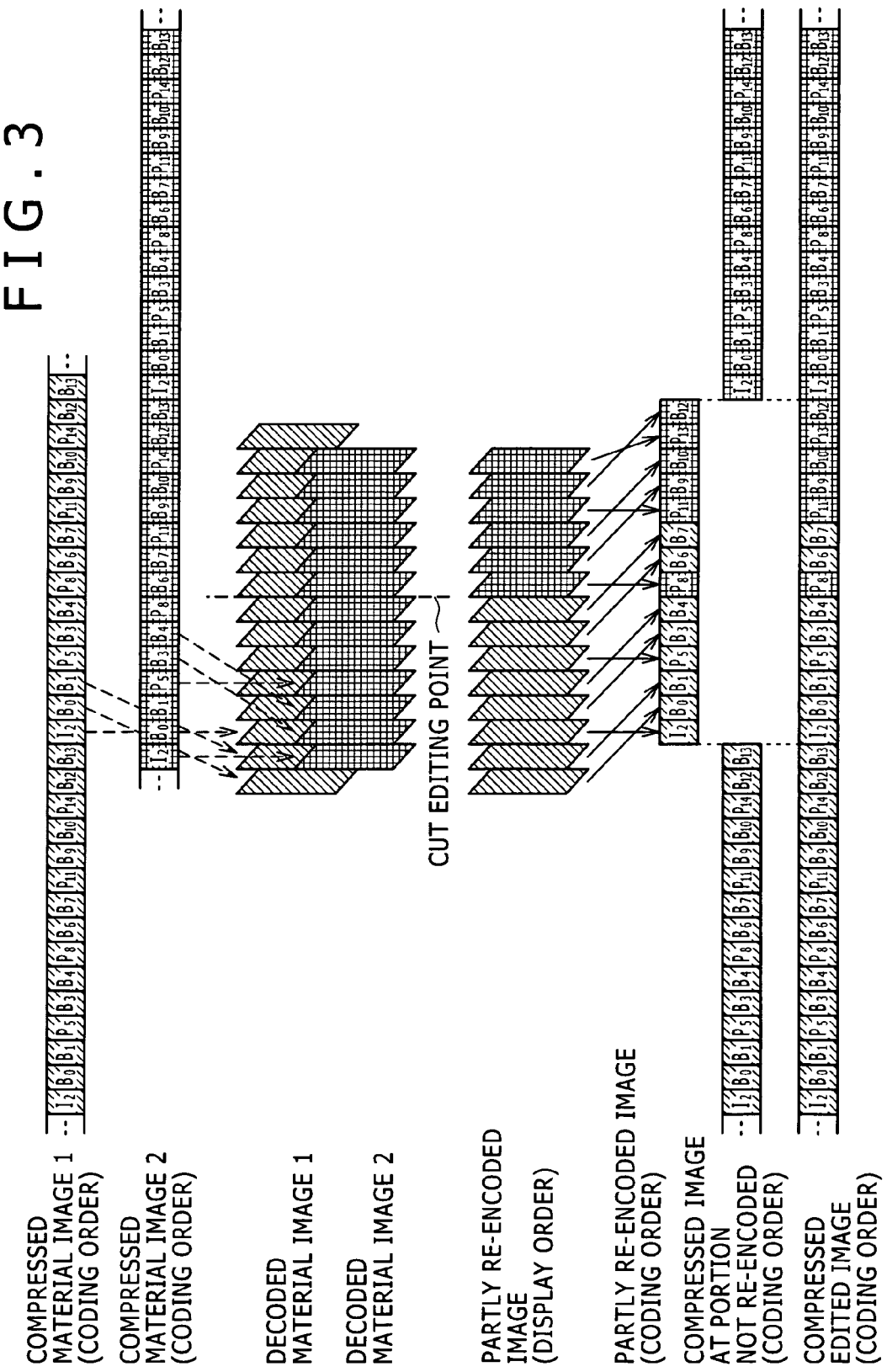
FIG. 3 is a diagrammatic view illustrating arrays of pictures in a display order in editing and partial re-encoding where the Closed GOP structure is used.
Figure 4:
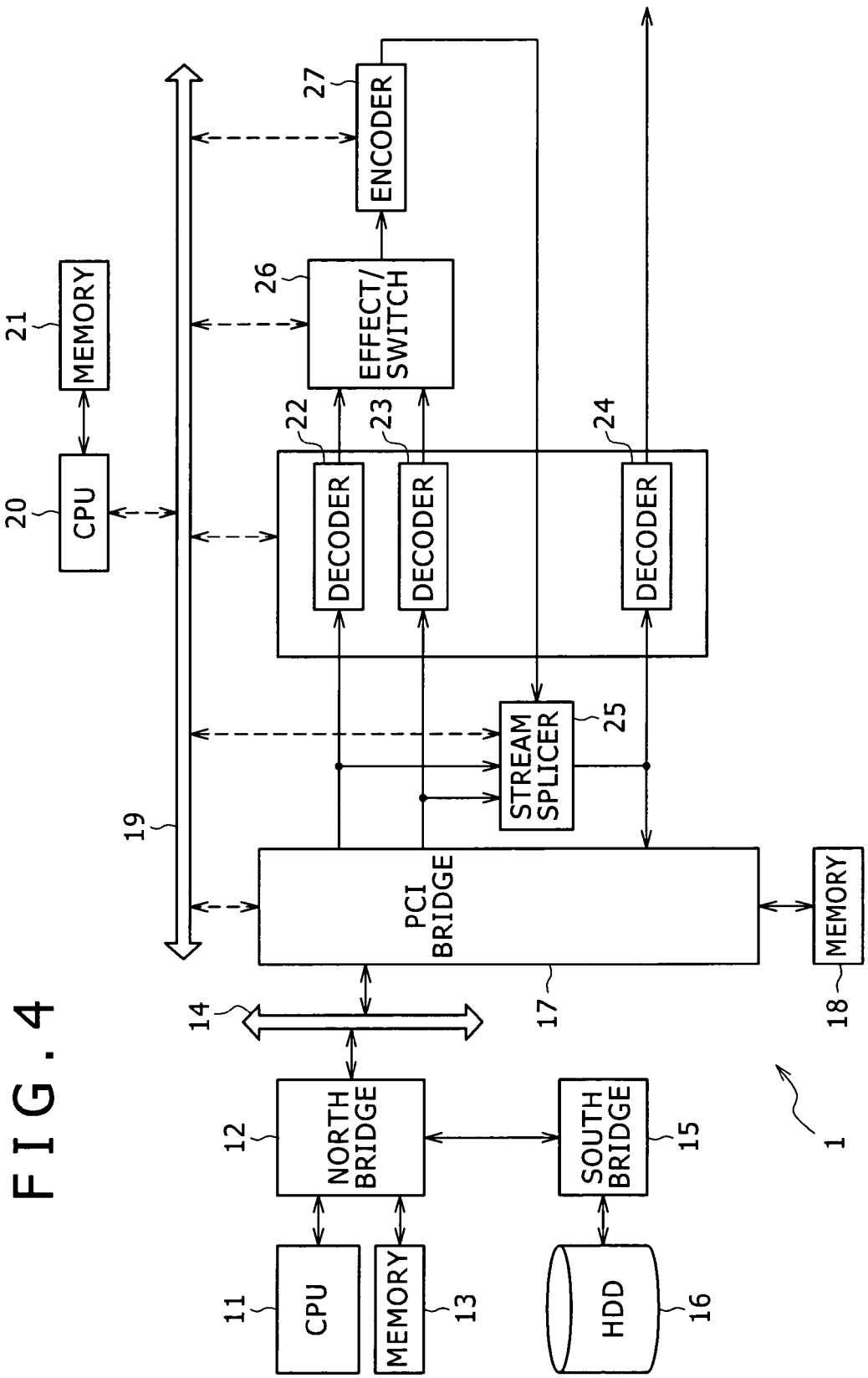
FIG. 4 is a block diagram showing a configuration of an editing apparatus to which the present invention is applied.

FIG. 4 shows in block diagram a hardware configuration of an editing apparatus to which the present invention is applied.

Referring to FIG. 4, the editing apparatus 1 shown includes a CPU (Central Processing Unit) 11 connected to a north bridge 12 and adapted, for example, to control such processes as a reading out process of data stored in an HDD (hard disk drive) 16 and produce and output a command for controlling an editing process to be executed by another CPU 20. The north bridge 12 is connected to a PCI (Peripheral Component Interconnect/Interface) bus 14, and receives supply of data stored in the HDD 16 through a south bridge 15 and supplies the received data to a memory 18 through the PCI bus 14 and a PCI bridge 17. The north bridge 12 is connected also to a memory 13 and supplies and transfers data necessary for processing of the CPU 11 to and from the memory 13.

The memory 13 stores data necessary for processing to be executed by the CPU 11. The south bridge 15 controls writing and reading out of data into and from the HDD 16. The HDD 16 has compression coded materials for editing stored therein.

The PCI bridge 17 controls writing and reading out of data into and from the memory 18 and controls supply of compression coded data to decoders 22 to 24 or a stream splicer 25. Further, the PCI bridge 17 controls transfer of data to and from the PCI bus 14 and a control bus 19. The memory 18 stores compression coded data of materials for editing read out from the HDD 16 or compression coded data after editing supplied from the stream splicer 25 under the control of the PCI bridge 17.

The CPU 20 controls processes to be executed by the PCI bridge 17, the decoders 22 to 24, the stream splicer 25, an effect/switch 26 and an encoder 27 in accordance with a command supplied from the CPU 11 through the north bridge 12, PCI bus 14, PCI bridge 17 and control bus 19. A memory 21 stores data necessary for processing by the CPU 20.

The decoders 22 to 24 decode compression coded data supplied thereto and output a resulting non-coded image signal under the control of the CPU 20. The stream splicer 25 splices compressed image data supplied thereto at a predetermined frame under the control of the CPU 20. The decoders 22 to 24 may otherwise be provided as independent apparatus which are not included in the encoder 27. For example, where the decoder 24 is provided as an independent apparatus, it can receive supply of compressed edited image data produced by editing by a process hereinafter described, decode the compressed edited image data and output resulting data.

The effect/switch 26 changes over between non-compressed image signal outputs supplied thereto from the decoder 22 and the decoder 23, that is, splices non-compressed image signals supplied thereto at a predetermined frame under the control of the CPU 20. Further, the effect/switch 26 applies an effect to the resulting image signal as occasion demands and supplies a resulting signal to the encoder 27. The encoder 27 encodes the non-compressed image signal supplied thereto and outputs resulting compression coded compressed image data to the stream splicer 25 under the control of the CPU 20.

Now, operation of the editing apparatus 1 is described.

Figure 5:
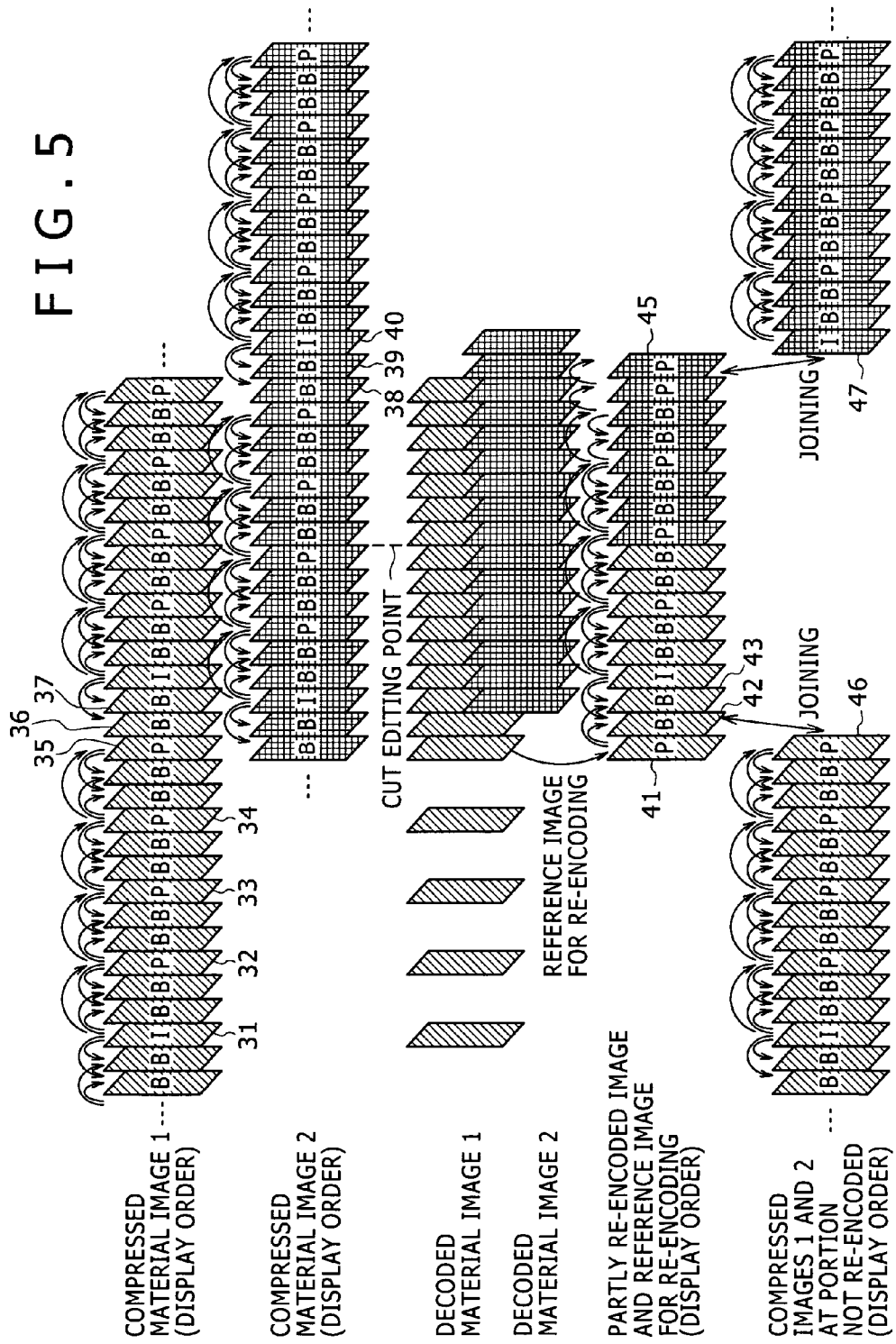
FIG. 5 is a diagrammatic view illustrating partial re-encoding and editing processes which can be executed by the editing apparatus of FIG. 4.

In the HDD 16, data of a compressed material image 1 and a compressed material image 2 compressed in accordance with the Long Open GOP system illustrated in FIG. 5 are stored. Referring to FIG. 5, the compressed material image 1 and the compressed material image 2 are illustrated in an order of pictures to be displayed (in a display order).

The CPU 11 controls the south bridge 15 to read out the data of the compression coded compressed material image 1 and the data of the compression coded compressed material image 2 from the HDD 16 in response to an operation of a user supplied thereto from an operation inputting section not shown and supply the read out data to the memory 18 through the north bridge 12, PCI bus 14 and PCI bridge 17 so as to be stored into the memory 18. Further, the CPU 11 supplies information representing editing points and a command indicating starting of editing to the CPU 20 through the north bridge 12, PCI bus 14, PCI bridge 17 and control bus 19.

The CPU 20 determines, based on the information representative of the editing points supplied thereto from the CPU 11, those ranges of the compression coded data of the compressed material image 1 and the compression coded compressed material image 2 within which re-encoding is to be performed. Then, the CPU 20 controls the PCI bridge 17 to supply, from among the data of the compression coded compressed material image 1 stored in the memory 18, those data of the compressed material image 1 which correspond to pictures for which re-encoding is to be performed and pictures necessary to be referred to the decoder 22 and, from among the data of the compressed material image 2, those data of the compressed material image 2 which correspond to pictures for which re-encoding is to be performed and pictures necessary to be referred to the decoder 23.

In particular, if a B picture 36 and another B picture 37 in the compressed material image 1 are included in a range for which re-encoding is to be performed, then in order to decode the B picture 36 and the B picture 37, also an I picture 31 and P picture 32, P picture 33, P picture 34, as well as another P picture 35 are decoded. Similarly, if a B picture 38 and another B picture 39 in the compressed material image 2 are included in a range for which re-encoding is to be performed, then in order to decode the B picture 38 and the B picture 39, also an I picture 40 is decoded.

Further, the CPU 20 controls the PCI bridge 17 to supply those of the compression coded compressed material image 1 and the compression coded compressed material image 2 stored in the memory 18 which are within ranges within which re-encoding is not to be performed to the stream splicer 25.

The CPU 20 controls the decoder 22 and the decoder 23 to decode the compression coded data supplied to them.

The decoder 22 and the decoder 23 decode the data supplied thereto under the control of the CPU 20 and supply signals of the material image 1 and the material image 2 obtained by the decoding to the effect/switch 26. The effect/switch 26 splices the non-compressed signals of the compressed material image 1 with the compressed material image 2 at a predetermined cut editing point (splice point) and applies an effect to the resulting signal as occasion demands to produce a non-compressed edited image signal for re-encoding under the control of the CPU 20. The produced non-compressed edited image signal for re-encoding is supplied to the encoder 27 together with re-encoding reference pictures necessary for re-encoding (in FIG. 5, image data corresponding to a P picture 41 necessary to encode a B picture 42 and another B picture 43).

The encoder 27 encodes the non-compressed edited image signal for re-encoding supplied thereto from the effect/switch 26 under the control of the CPU 20.

At the time, in order to encode the B picture 42 and the B picture 43 for which bidirectional prediction encoding is to be performed, the encoder 27 must use the immediately preceding P picture 41 as a reference image as seen in FIG. 5. Further, by determining the picture type such that the last picture in re-encoding may be a P picture, it is possible to eliminate the necessity to use a picture succeeding the last picture in re-encoding as a reference picture for encoding.

In other words, by performing re-encoding with such a picture type that the end point of re-encoding comes to a break of a GOP (that is, with any other picture than a B picture), even where the compressed material image data for editing have the Open GOP structure, the necessity to use a picture succeeding the last picture in re-encoding as a reference picture for encoding is eliminated.

Then, the image data re-encoded by the encoder 27 are supplied to the stream splicer 25. The stream splicer 25 splices, from among the data of the compressed material image 1 and the compressed material image 2 supplied thereto from the PCI bridge 17, those data of the compressed material image 1 and the compressed material image 2 within the ranges for which re-encoding is not to be performed and the encoded image data supplied thereto from the encoder 27 to each other to produce compressed edited image data under the control of the CPU 20.

More particularly, the stream splicer 25 splices the streams each other under the control of the CPU 20 such that the P picture 45 of the encoded image data supplied thereto from the encoder 27 and including the P picture 46 of the compressed material image 1 supplied from the PCI bridge 17 and the B picture 42 of the encoded image data supplied from the encoder 27 and spliced contiguously with the P picture 46 in the display order and the I picture 47 of the compressed material image 2 supplied thereto from the PCI bridge 17 are contiguous to each other in the display order.

Then, the stream splicer 25 supplies the produced compressed edited image data to the PCI bridge 17 so that they are stored into the memory 18, and further supplies the produced compressed edited image data to the decoder 24 so as to be decoded thereby under the control of the CPU 20. The decoded compressed edited image data are outputted from the decoder 24 to a monitor for confirmation of a result of editing so as to be displayed. Further, a base band signal produced by the decoding is outputted to a different apparatus.

If an instruction to store compressed edited image data produced by editing is received from the operation inputting section not shown, then the CPU 11 controls the PCI bridge 17 to read out the compressed edited image data stored in the memory 18 and supply the read out compressed edited image data to the south bridge 15 through the PCI bus 14 and the north bridge 12. Further, the CPU 11 controls the south bridge 15 to supply the compressed edited image data supplied to the same to the HDD 16 so as to be stored into the HDD 16.

Figure 6:
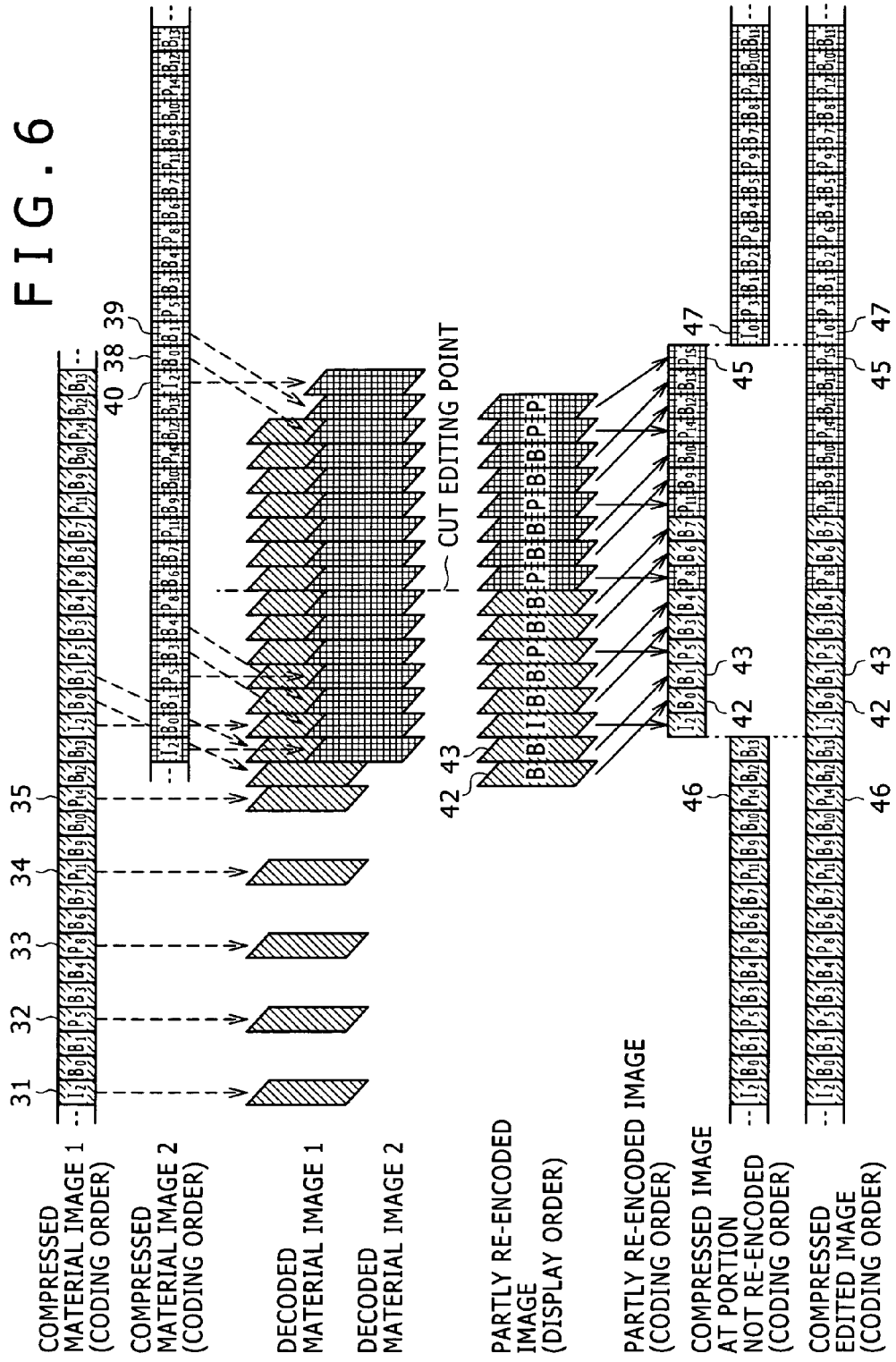
FIG. 6 is a similar view but illustrating arrays of pictures in a display order in the partial re-encoding and editing processes illustrated in FIG. 5.

Actual encoding is performed in the coding order and also compressed images encoded by the encoder 27 are outputted in the coding order. FIG. 6 illustrates arrays of pictures in compressed signals in the case described above with reference to FIG. 5 in the coding order.

A re-encoding range including an editing point is determined in data of each of the compressed material image 1 of an object of editing and the compressed material image 2 of another object of editing, and the compressed material image 1 and the compressed material image 2 in the re-encoding ranges are decoded to produce a signal of a non-compressed material image 1 and a signal of a non-compressed material image 2, respectively. Then, the signals of the non-compressed material image 1 and the non-compressed material image 2 are spliced together at the cut editing point, and partial re-encoding of the signals of the non-compressed material image 1 and the non-compressed material image 2 spliced together is performed such that the last picture may be a P picture (or an I picture) thereby to produce compressed image data. Then, the compressed image data are spliced with the compressed image data at the portions for which re-encoding is not performed to produce compressed edited image data.

The compressed image data produced by the partial re-encoding of the material image 1 and the material image 2 spliced together and the compressed image data at one of the portions for which re-encoding is not performed are spliced at the $B_{13}$ picture. The $B_{13}$ picture is the last picture in the coding order among the data of the compressed material image 1 at the portion for which re-encoding is not performed. The $B_{13}$ picture is the fourteenth picture in the display order and the $I_2$ picture is the top picture in the coding order among the compressed image data produced by the re-encoding $I_2$ picture and is the third picture in the display order. Further, the compressed image data produced by the partial re-encoding of the material image 1 and the material image 2 spliced together and the compressed image data at the other of the portions at which re-encoding is not performed are spliced together at the $P_{15}$ picture (P picture 45). The $P_{15}$ picture is the last picture in the coding order among the compressed image data produced by the re-encoding. The $P_{15}$ picture is the sixteenth picture in the display order and the $I_0$ picture (I picture 47) is the top picture in the coding order in the compressed material image 2 at the portion at which re-encoding is not performed and the $I_0$ is the third picture in the display order of the data. In other words, the compressed image data produced by partial re-encoding of the material image 1 and the material image 2 spliced together and the compressed image data at the portions at which re-encoding is not performed are spliced together independently of the changeover position between GOPs to produce compressed edited image data.

In this manner, the $P_{15}$ picture (P picture 45) which is the last picture in re-encoding in the display order is the last picture in re-encoding also in the coding order. By determining the picture type in this manner, the necessity to use a picture succeeding the last picture in re-encoding as a reference picture for encoding can be eliminated.

In this instance, it is necessary to perform the re-encoding taking also a VBV (Video Buffering Verifier) buffer into consideration. The VBV buffer when editing is performed is described with reference to FIG. 7.

When encoding is performed, the generation code amount must be controlled so as to be allocated to each picture so that none of an overflow and an underflow may occur with the VBV buffer in order that a decoder at a succeeding stage may perform decoding normally. Particularly where partial re-encoding for editing is performed, the re-encoding must be performed so that none of an overflow and an underflow may occur with the VBV buffer also at a portion for which the partial re-encoding is not performed (particularly in the proximity of a splicing point between a portion at which re-encoding is performed and another portion at which no re-encoding is performed).

Figure 7:
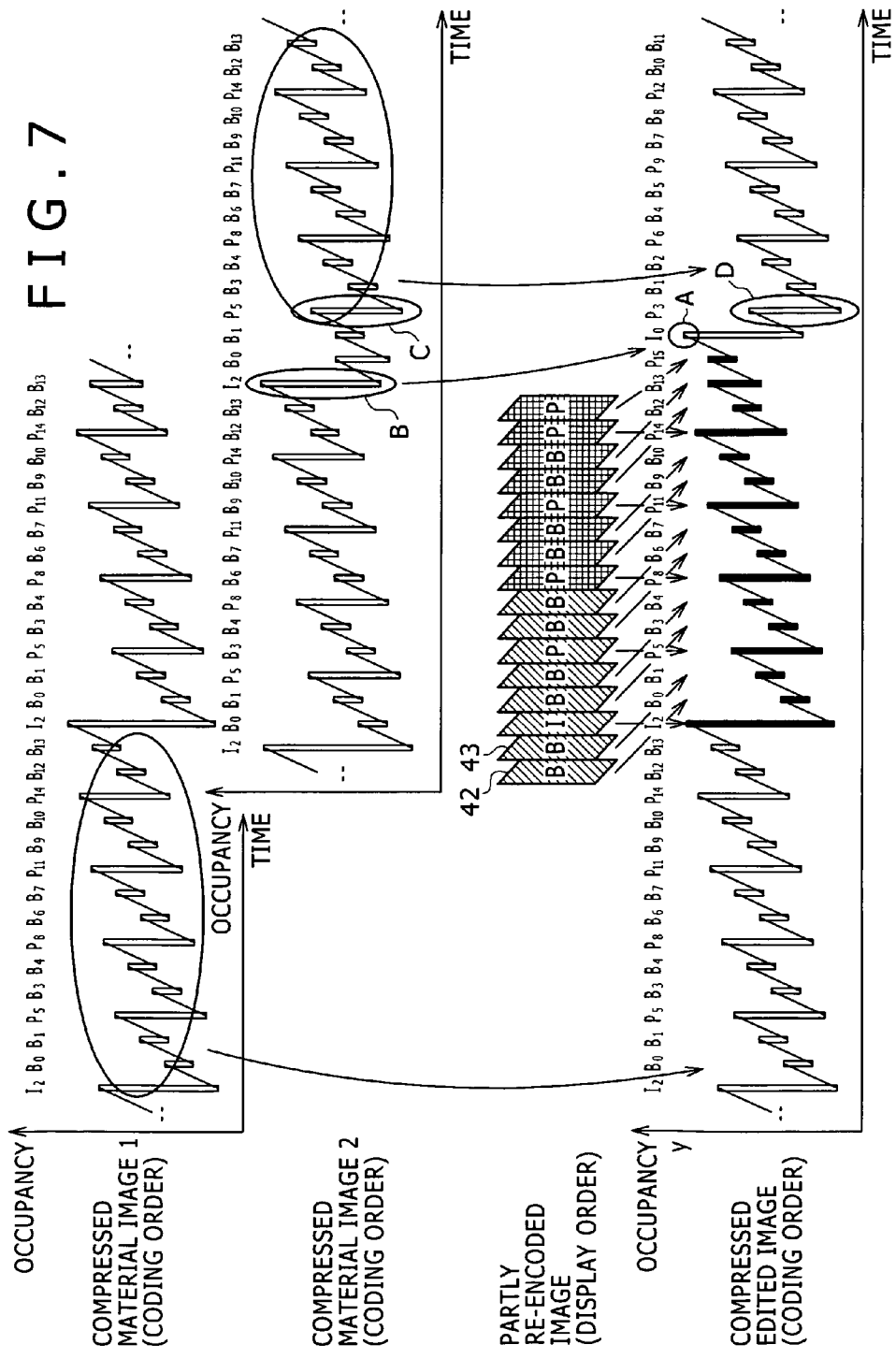
FIG. 7 is a diagrammatic view illustrating a VBV buffer where the partial re-encoding and editing processes illustrated in FIG. 5 are executed.

What is influenced by the state of a buffer for re-encoded compressed image data is compressed image data at a portion for which re-encoding is not performed and which is spliced next to the re-encoded compressed image signal. The sufficient condition that the compressed image data at the portion for which re-encoding is not performed do not cause an overflow or an underflow is that the occupancy of the first I picture or P picture of the compressed edited image data at a portion for which re-encoding is not performed and which is spliced with the next to the re-encoded compressed image signal, that is, the occupancy of a P picture denoted by D in FIG. 7 succeeding an I picture denoted by A in FIG. 7, is equal to the occupancy of an I picture or a P picture next to an I picture indicated by B in FIG. 7 of the data of the compressed material image 2, that is, the occupancy of a P picture indicated by C in FIG. 7. Therefore, when re-encoding is preformed, the occupancy of the buffer at a point of time when the re-encoding comes to an end (portion indicated by A in FIG. 7) must be controlled so that a value which satisfies the condition described above may be obtained.

By the control just described, an otherwise possible breakdown of the VBV buffer can be prevented to the utmost.

However, depending upon the generation code amount of the I picture indicated by A and the next I or P picture, it is impossible to control the occupancy of the I picture denoted by A so that the occupancy of the P picture denoted by D may be equal to the occupancy of the P picture indicated by C in FIG. 7 of the data of the compressed material image 2 as described hereinabove, resulting in the possibility that the VBV buffer may break down.

A case wherein the VBV buffer breaks down is described with reference to FIG. 8.

Generally, the generation code amount of an I picture and the generation code amount of a P picture are greater than the generation code amount of a B picture. For example, a case is considered wherein the generation code amount B of the $I_2$ picture which is an I picture at the top of data of the compressed material image 2 which is to be spliced with the next to compressed image data produced by re-encoding but is not re-encoded and the generation code amount C of the $P_5$ picture which is a P picture succeeding the $I_2$ picture are great.

Figure 8:
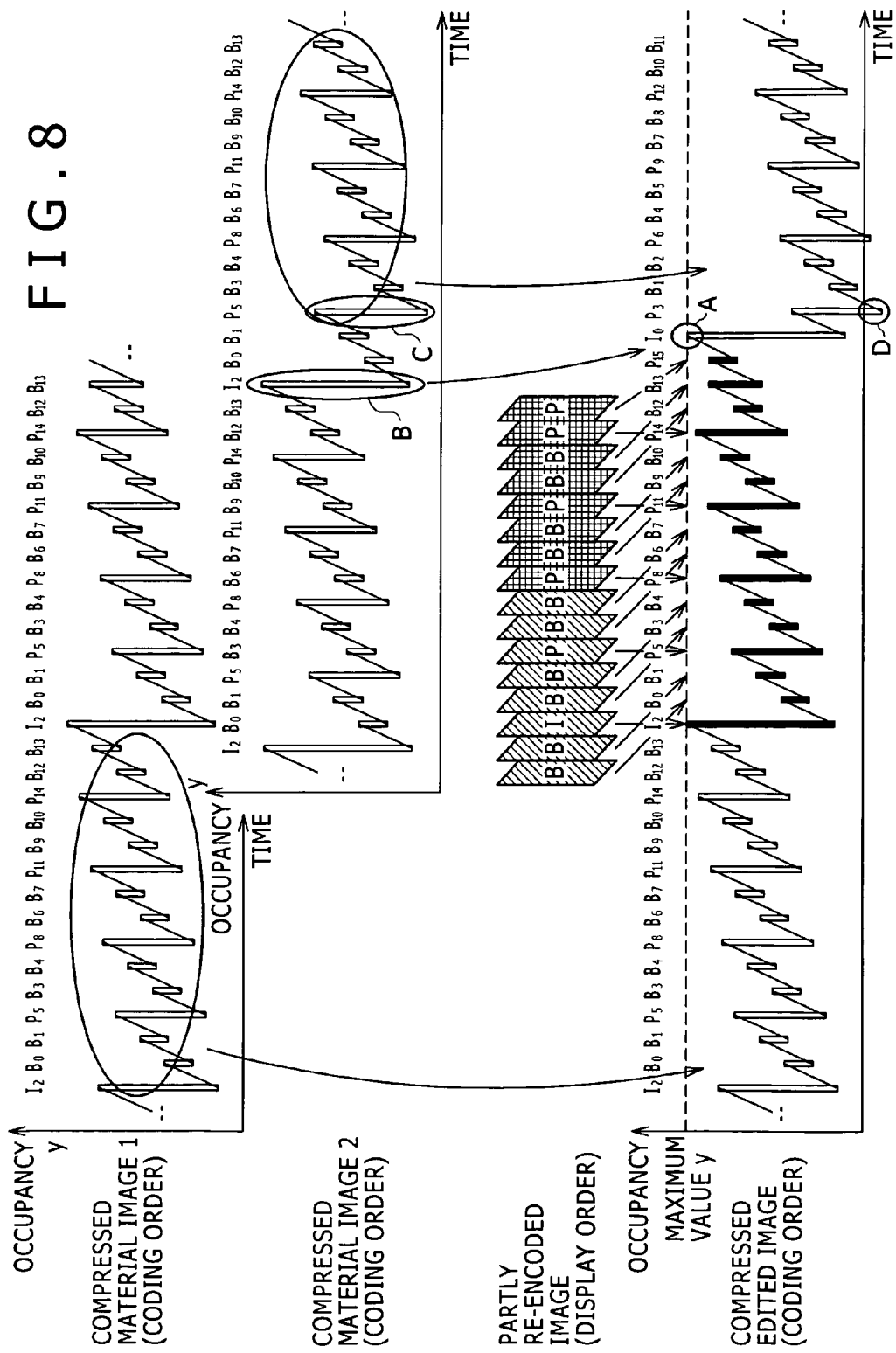
FIG. 8 is a similar view but illustrating a breakdown of the VBV buffer where the partial re-encoding and editing processes illustrated in FIG. 5 are executed.

In this instance, even if it is tried to control the occupancy of the I picture denoted by A so that the occupancy of a portion denoted by D of a P picture succeeding an I picture at the top of a portion of a compressed edited image produced by editing which succeeds a partially encoded portion and is not partially encoded may become equal to the occupancy of a portion denoted by C of the data of the compressed material image 2 before the editing, since the code generation amounts of both of the successive I picture and P picture are great, the buffer underflows as denoted by D in FIG. 8. In the example shown, since the occupancy of the I picture denoted by A of the $I_0$ picture after the editing is a substantially maximum value of the buffer, in whatever manner the generation code amount is controlled at the re-encoded portion, the underflow of the buffer cannot be avoided at the portion denoted by D in FIG. 8. In other words, with the method described hereinabove with reference to FIGS. 5 and 6, the decoding process by a decoder cannot be guaranteed by 100%.

Therefore, the CPU 20 can control the processes to be executed by the decoder 22 and decoder 23, stream splicer 25, effect/switch 26 and encoder 27 so that re-encoding may be performed while a condition for preventing a breakdown of the VBV buffer is observed.

Now, a method of editing an image signal compressed in accordance with the Long Open GOP system while a condition for preventing a breakdown of the VBV buffer is observed is described.

The CPU 11 controls the south bridge 15 to read out the data of the compression coded compressed material image 1 and the data of the compression coded compressed material image 2 from the HDD 16 in response to an operation of a user supplied thereto from an operation inputting section not shown and supply the read out data to the memory 18 through the north bridge 12, PCI bus 14 and PCI bridge 17 so as to be stored into the memory 18. Further, the CPU 11 supplies information representing editing points and a command indicating starting of editing to the CPU 20 through the north bridge 12, PCI bus 14, PCI bridge 17 and control bus 19.

The CPU 20 determines, based on the information representative of the editing points supplied thereto from the CPU 11, those ranges of the compression coded data of the compressed material image 1 and the compression coded data of the compressed material image 2 within which re-encoding is to be performed.

More particularly, the CPU 20 determines the start point of the section of the compressed material image 1 for which re-encoding is to be performed so that the picture type of the last picture in the display order of the compressed image at the portion for which re-encoding is not to be performed and is to be spliced with the front of the partially re-encoded compressed image may be an I picture or a P picture.

Figure 9:
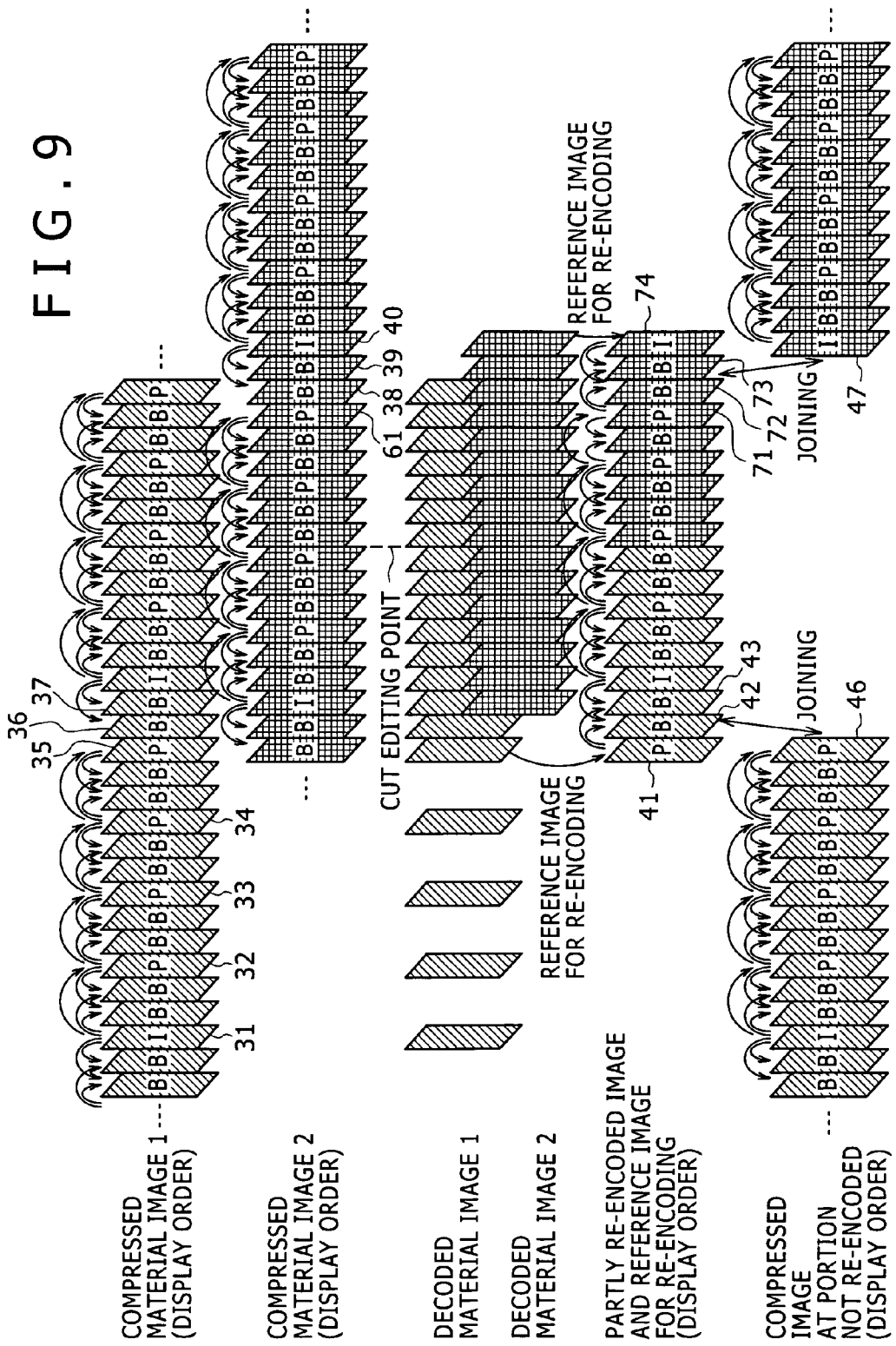
FIG. 9 is a diagrammatic view illustrating partial re-encoding and editing processes executed taking the VBV buffer into consideration.

In particular, the CPU 20 determines, for example, the B picture 36 next to the P picture 35 in the compressed material image 1 as the start point of the section for which re-encoding is to be performed so that the picture type of the last picture in the display order of the compressed material image 1 at the portion for which re-coding is not to be performed may be the P picture 46 as shown in FIG. 9. In other words, the CPU 20 can make it easy to perform an encoding process by controlling the portion for which re-encoding is not to be performed so that the compressed image at the portion may be the end position of a GOP.

The CPU 20 further determines the end point of the section of the compressed material image 2 for which re-encoding is to be performed so that the picture type of the first picture in the display order of the compressed image at the portion which is to be spliced with the next to the compressed image at the portion for which re-encoding is not to be performed may be an I picture.

In particular, the CPU 20 determines, for example, the B picture 39 preceding to the I picture 40 in the compressed material image 2 as the end point of the section for which re-encoding is to be performed so that the picture type of the first picture in the display order of the compressed material image 2 at the portion for which re-coding is not to be performed may be the I picture 47 as shown in FIG. 9.

Then, the CPU 20 controls the PCI bridge 17 to supply, from among the data of the compression coded compressed material image 1 stored in the memory 18, those pictures within the range within which re-encoding is to be performed and the data of the I picture 31, P picture 32, P picture 33, P picture 34 and P picture 35 which must be referred to in order to decode the B picture 36 and the B picture 37 to the decoder 22. The CPU 20 further controls the PCI bridge 17 to supply, from among the data of the compressed material image 2 stored in the memory 18, those pictures within the range within which re-encoding is to be performed and the data of the I picture 40 which must be referred to in order to decode the B picture 38 and the B picture 39 to the decoder 23.

Further, the CPU 20 controls the PCI bridge 17 to supply those pictures within the range within which re-encoding is not to be performed from among the data of the compression coded compressed material image 1 and compressed material image 2 stored in the memory 18 to the stream splicer 25.

The CPU 20 controls the decoder 22 and the decoder 23 to decode the compression coded data supplied to them.

The decoder 22 and the decoder 23 decode the data supplied thereto under the control of the CPU 20 and supply the signals of the compressed material image 1 and the compressed material image 2 obtained by the decoding to the effect/switch 26. The effect/switch 26 splices the non-compressed signals of the compressed material image 1 with the compressed material image 2 at a predetermined cut editing point (splice point) and applies an effect to the resulting signal as occasion demands to produce a non-compressed edited image signal for re-encoding under the control of the CPU 20. The produced non-compressed edited image signal for re-encoding is supplied to the encoder 27 together with re-encoding reference images necessary for re-encoding (in FIG. 9, image data corresponding to the P picture 41 necessary to encode the B picture 42 and the B picture 43 and the I picture 74 necessary to encode the B picture 72 and the B picture 73).

The CPU 20 acquires information of the number n of successive B pictures positioned at the last in the display order in the portion of the compressed material image 2 for which re-encoding is to be performed. Since it is determined that the picture type of the first picture in the display order of the compressed material image 2 at the portion for which re-encoding is not to be performed is an I picture as described above, the number n of B pictures is the number of whose B pictures which are included between the first I picture in the display order of the compressed material image 2 at the portion for which re-encoding is not to be performed and an I picture or a P picture which exists immediately preceding to the I picture after the editing. In the case illustrated in FIG. 9, the number of B pictures is two including the B picture 38 and the B picture 39.

Further, the CPU 20 acquires information of the picture type of an I picture or a P picture which exists immediately preceding to the first I picture in the display order of the compressed material image 2 at the portion for which re-encoding is not to be performed, or in other words, information of the picture type of an I picture or a P picture which exits at the last in the range for which re-encoding is to be performed. In the case illustrated in FIG. 9, the I picture or the P picture which exists immediately preceding to the first I picture in the display order of the compressed material image 2 in the portion for which re-encoding is not to be performed is the P picture 61.

Then, the CPU 20 controls the encoder 27 so that the number of B pictures in the proximity of the end point of re-encoding may become equal to that of the compressed material image 2 before the editing and the picture type of the picture immediately preceding to the B pictures may be an I picture or a P picture in a process executed by the encoder 27. Further, the CPU 20 preferably controls the encoder 27 so that also the picture type of the picture immediately preceding to the B pictures may be same as that of the compressed material image 2 before the editing.

In particular, in the case of FIG. 9, the CPU 20 controls the encoder 27 so that the picture type of the B picture 38 and the B picture 39 of the compressed material image 2 before the editing and the picture type of the B picture 72 and the B picture 73 in re-encoding coincide with each other and the P picture 71 is positioned immediately preceding to the B picture 72 and the B picture 73 in re-encoding.

The encoder 27 encodes the non-compressed edited image signal for re-encoding supplied thereto from the effect/switch 26 under the control of the CPU 20.

Then, the image data re-encoded by the encoder 27 are supplied to the stream splicer 25. The stream splicer 25 splices, from among the data of the compressed material image 1 and the compressed material image 2 supplied thereto from the PCI bridge 17, those data of the compressed material image 1 and the compressed material image 2 within the ranges for which re-encoding is not to be performed with the encoded image data supplied thereto from the encoder 27 each other to produce compressed edited image data under the control of the CPU 20.

In particular, the stream splicer 25 splices the streams together under the control of the CPU 20 so that the P picture 46 of the compressed material image 1 supplied from the PCI bridge 17 and the B picture 42 of the encoded image data supplied from the encoder 27 are spliced together in the display order and the B picture 73 of the encoded image data supplied from the encoder 27 and the I picture 47 of the compressed material image 2 supplied from the PCI bridge 17 are spliced together in the display order.

Actual encoding is performed in the cording order, and also compressed images encoded by the encoder 27 are outputted in the coding order. Arrays of pictures in compressed signals corresponding to those described hereinabove with reference to FIG. 9 are shown in the coding order in FIG. 10.

More particularly, the stream splicer 25 splices the streams together in the following manner under the control of the CPU 20. In particular, the B picture 81 succeeding the P picture 71 in the coding order in the encoded image data and the I picture 47 (I picture not re-encoded) of the compressed material image 2 are contiguous to each other at a splicing point between a portion which has been re-encoded and another portion which has not been re-encoded. Further, the I picture 47 of the compressed material image 2 and the B picture 72 of the encoded image data are contiguous to each other in the coding order. Furthermore, the B picture 73 succeeding the B picture 72 in the coding order in the encoded image data and the P picture 82 of the compressed material image 2 are contiguous to each other.

In other words, the stream splicer 25 splices the streams together so that an I picture which is not re-encoded may be placed to a position preceding to n re-encoded B pictures succeeding the last I picture or P picture in the re-encoded section in the coding order.

Then, the stream splicer 25 supplies the produced compressed edited image data to the PCI bridge 17 so that they are stored into the memory 18, and further supplies the produced compressed edited image data to the decoder 24 so as to be decoded thereby under the control of the CPU 20. The decoded compressed edited image data are outputted from the decoder 24 to a monitor for confirmation of a result of editing so as to be displayed. Further, a base band signal produced by the decoding is outputted to a different apparatus. Where the decoder 24 is formed as an independent apparatus, the apparatus corresponding to the decoder 24 can receive supply of the edited compressed image data produced by the process described above with reference to FIGS. 9 and 10, and in other words, including the I picture not re-encoded and placed preceding to the n re-encoded B pictures succeeding the last I picture or P picture in the re-encoded section and decode the received edited compressed image data, and then output a base band signal produced by the decoding.

Now, the VBV buffer used to perform an editing process utilizing re-encoding as described above with reference to FIGS. 9 and 10 is described with reference to FIG. 11.

When the editing process described hereinabove with reference to FIGS. 9 and 10 in which re-encoding is utilized is performed, an I picture which is not re-encoded is inserted to a position preceding to the last n B pictures in re-encoding in the coding order. Accordingly, as seen in FIG. 11, a portion of the re-encoding range except the last n B pictures (portion denoted by E in FIG. 11) is re-encoded so that the occupancy of the I picture which is not re-encoded may coincide with that before the editing. Thereafter, information (in FIG. 11, a portion denoted by F) of the generation code amount of the I picture which is not re-encoded is determined from information (in FIG. 11, a portion denoted by B) of the generation code amount of the corresponding I picture of the compressed material image 2 to calculate the occupancy of the VBV buffer.

Thereafter, in order to prevent an overflow or an underflow of the VBV buffer for the compressed image which is not re-encoded, encoding is performed with the generation code amount at the last n B pictures (in FIG. 11, a portion denoted by G) in the re-encoded portion so that the values of the occupancy of the I picture or P picture positioned next to the top I picture of the compressed image which is not re-encoded before and after the editing may coincide with each other. In particular, since the generation code amount denoted by C before the editing and the generation code amount denoted by H after the editing are equal to each other in FIG. 11, re-encoding of the n B pictures is performed so that the occupancy denoted by J after the editing may coincide with the occupancy denoted by I before the editing. As a result, no underflow of the buffer occurs at any of portions denoted by K and L in FIG. 11.

Figure 11:
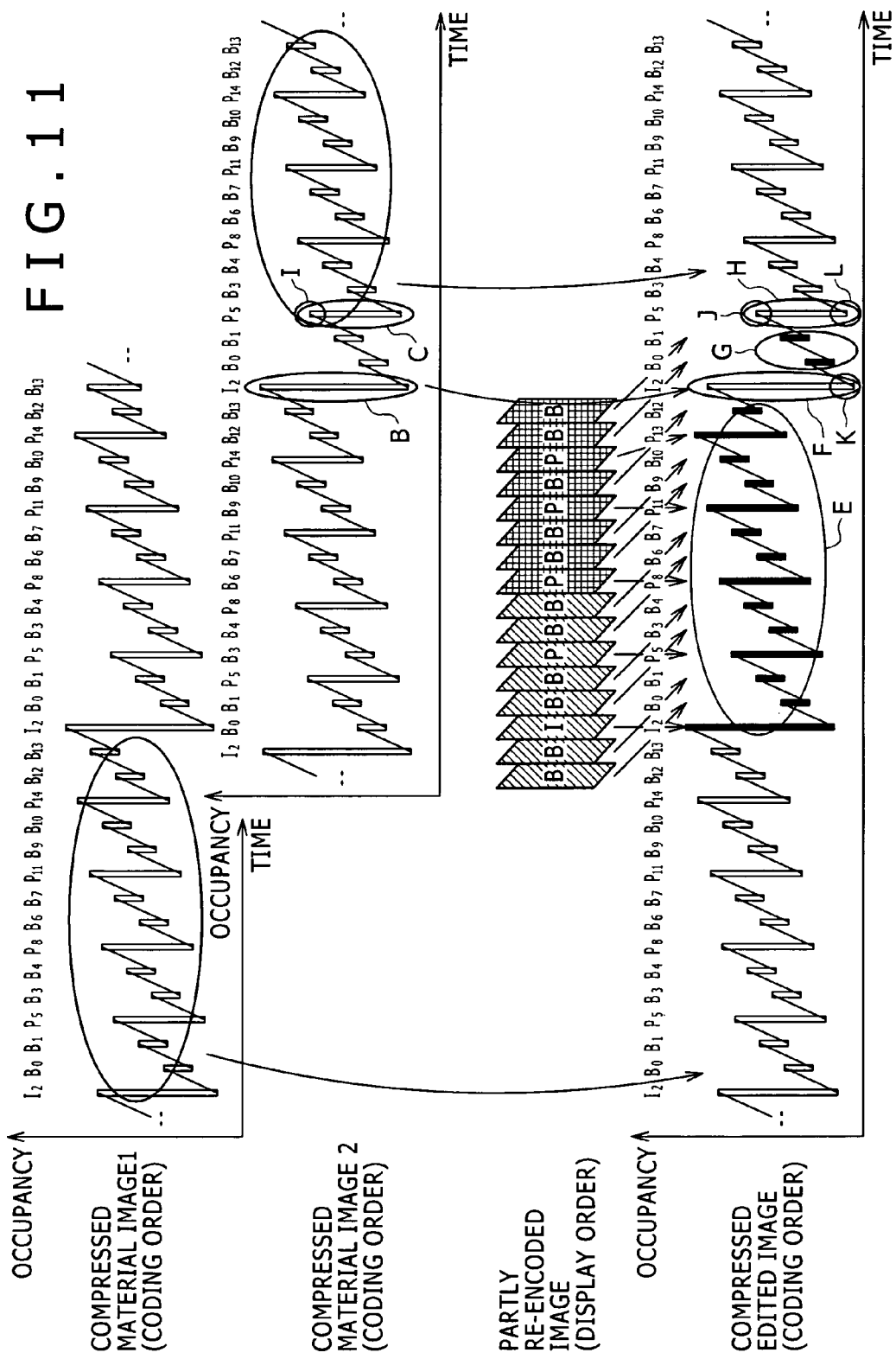
FIG. 11 is a diagrammatic view illustrating action of the VBV buffer where the partial re-encoding and editing processes illustrated in FIG. 9 are executed.

According to the method described, since the picture types at splicing portions of compressed images at a portion for which re-encoding is performed and another portion for which re-encoding is not performed are maintained before and after editing, even if the generation code amount F of the I picture at the top of the portion for which re-encoding is not performed and which is to be connected to the portion for which re-encoding is performed and the generation code amount H of the next I picture or P picture are great as seen in FIG. 11, if the restriction condition to the VBV buffer is satisfied with the data of the compressed material image 2 before the editing, then it is possible to perform encoding so that also the compressed images after editing may satisfy the restriction condition.

Now, an editing process is described with reference to a flow chart of FIG. 12.

At step S1, the CPU 11 receives an operation input of a user for instruction to start editing from the operation inputting section not shown and controls the south bridge 15 to read out the compression coded data of the compressed material image 1 and the compression coded data of the compressed material image 2 from the HDD 16 in accordance with the operation input of the user supplied thereto from the operation inputting section not shown and supply and store the read out data to and into the memory 18 through the north bridge 12, PCI bus 14 and PCI bridge 17. Further, the CPU 11 controls the south bridge 15 to supply information representative of editing points and a command for instruction to start editing to the CPU 20 through the north bridge 12, PCI bus 14, PCI bridge 17 and control bus 19.

At step S2, the memory 18 acquires the compression coded data of the two editing materials.

At step S3, the CPU 20 determines decoding ranges of the compression coded editing material data based on the information representative of the editing points and the command for instruction to start editing both supplied thereto from the CPU 11. In particular, the CPU 20 determines the decoding ranges so that the picture type of the last picture in the display order of the compressed material image 1 at a portion for which re-encoding is not to be performed may be a P picture and the picture type of the first picture in the display order of the compressed material image 2 at a portion for which re-encoding is not to be performed may be an I picture.

At step S4, the CPU 20 controls the PCI bridge 17 to extract data necessary for decoding and re-encoding data in the determined decoding ranges from the compression coded data of the two editing materials stored in the memory 18 and supply the extracted data to the decoder 22 and the decoder 23. Further, the CPU 20 controls the PCI bridge 17 to supply the compression coded editing material data at portions which are not to be re-encoded to the stream splicer 25. The PCI bridge 17 extracts the data necessary for decoding and re-encoding the data in the determined decoding ranges from the compression coded data of the two editing materials stored in the memory 18 and supply the compression coded editing material data in the portions which are not to be re-encoded to the decoder 22 and the decoder 23. Further, the compression coded editing material data at the portions for which re-encoding is not to be performed are supplied to the stream splicer 25.

At step S5, the CPU 20 controls the decoder 22 and the decoder 23 to decode the data in the determined decoding ranges. The decoder 22 and the decoder 23 decode the compression coded editing material data supplied thereto and supply resulting data to the effect/switch 26 under the control of the CPU 20.

At step S6, the CPU 20 controls the effect/switch 26 to splice the decoded data to each other at the editing points and apply an effect to the resulting data as occasion demands. The effect/switch 26 splices the non-compressed decoded image materials supplied thereto at the editing points and apply an effect to the resulting data as occasion demands under the control of the CPU 20. Then, the resulting data are supplied to the encoder 27.

At step S7, the CPU 20 controls the encoder 27 to re-encode the non-compressed decoded image material obtained by the splicing at the editing points. The encoder 27 performs re-encoding of the non-compressed decoded image material obtained by the splicing at the editing points and supply compression coded image data produced by the re-encoding to the stream splicer 25 under the control of the CPU 20.

Figure 15:
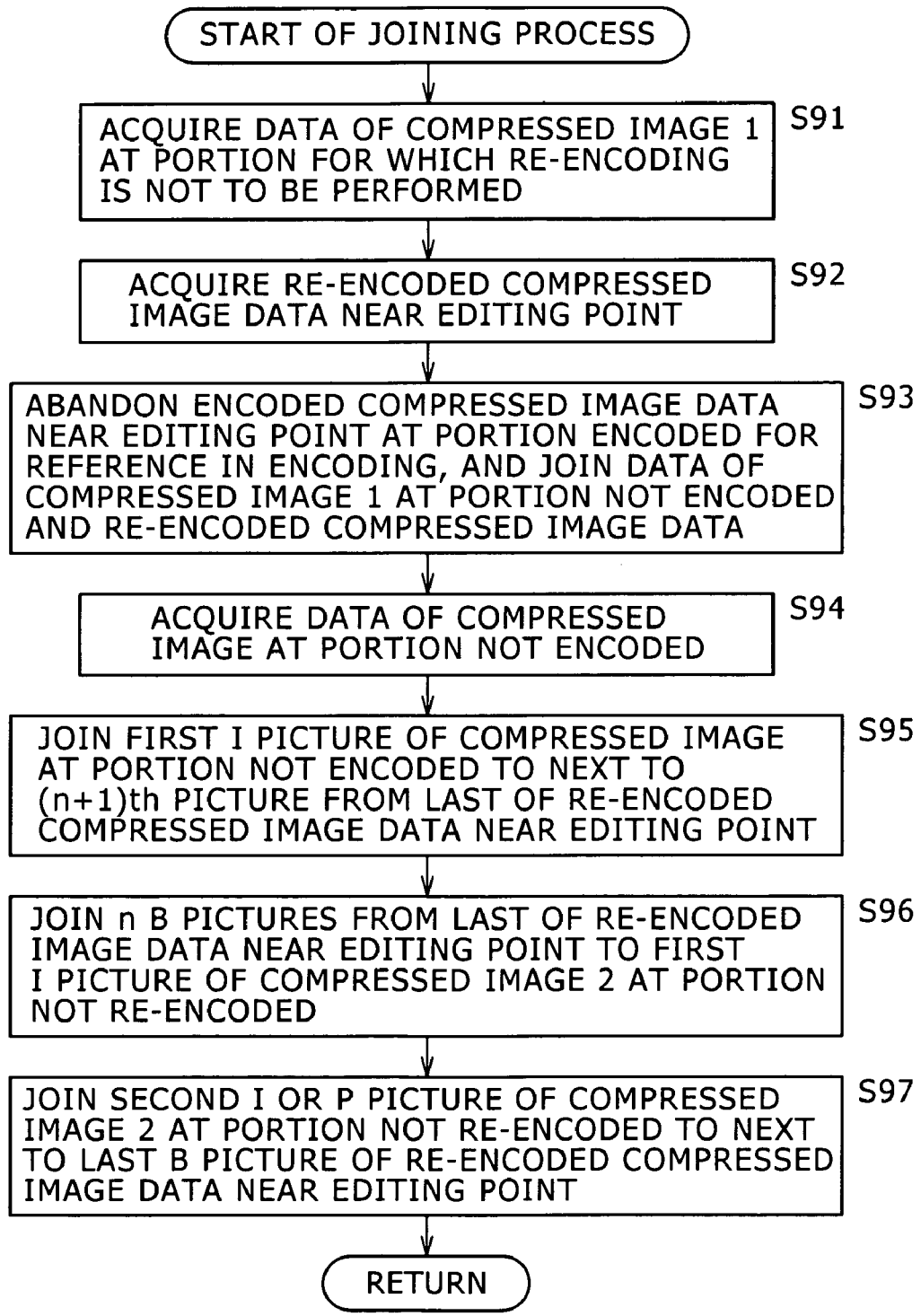
FIG. 15 is a flow chart illustrating a splicing process by the editing apparatus of FIG. 4.

At step S8, a splicing process which is hereinafter described with reference to FIG. 15 is executed. Then, after the process at step S8 comes to an end, the processing is ended.

According to the processing described above, editing of compressed image data of the Long Open GOP structure can be implemented by partly decoding portions of the compressed image data of the Long Open GOP structure in the proximity of editing points, splicing the decoded non-compressed image signals at a predetermined editing point, performing re-encoding of the image signal produced by the splicing and splicing the re-encoded image signal with the compressed image data at portions for which such decoding and re-encoding are not performed.

Now, a picture type determination process when re-encoding is executed (process at step S7 of FIG. 12) is described with reference to a flow chart of FIG. 13.

At step S31, the CPU 20 acquires the number n of successive B pictures at the last of a portion of the data of the compression coded image material 2 for which re-encoding is to be performed in the display order and controls the encoding process by the encoder 27 based on the number n of successive B pictures at the portion for which re-encoding is to be performed. The encoder 27 starts encoding of the image material data, produced by the splicing at the editing points, supplied from the effect/switch 26 under the control of the CPU 20.

At step S32, the encoder 27 decides whether or not the picture to be encoded is the n+1th picture from the last in the display order, that is, a picture corresponding to the P picture 71 shown in FIG. 9. If it is decided at step S32 that the picture to be encoded is the n+1th picture from the last, then the processing advances to step S35 hereinafter described.

On the other hand, if it is decided at step S32 that the picture to be encoded is not the n+1th picture from the last, then the encoder 27 decides at step S33 whether or not the picture to be encoded is the nth or succeeding picture from the last in the display order, that is, whether or not the picture to be encoded is a picture corresponding to the B picture 72 or the B picture 73 shown in FIG. 9. If it is decided at step S33 that the picture to be encoded is the nth or succeeding picture from the last in the display order, then the processing advances to step S38 hereinafter described.

On the other hand, if it is decided at step S33 that the picture to be encoded is not the nth or succeeding picture from the last, that is, the picture to be encoded is the n+2th or preceding picture (picture prior in time to the P picture 71 in FIG. 9) from the last, then the encoder 27 sets the picture type of the picture to be encoded in accordance with an ordinary algorithm at step S34. Thereafter, the processing advances to step S39 hereinafter described.

If it is decided at step S32 that the picture to be encoded is the n+1th picture from the last, that is, the picture to be encoded is a picture corresponding to the P picture 71 shown in FIG. 9, then the encoder 27 decides at step S35 whether or not the picture to be encoded is an I picture in the data of the compression coded image material 2.

If it is decided at step S35 that the picture to be encoded is an I picture in the data of the compression coded image material 2, then the encoder 27 sets the picture type of the picture to be encoded to an I picture at step S36. Thereafter, the processing advances to step S39 hereinafter described.

If it is decided at step S35 that the picture to be encoded is not an I picture in the data of the compression coded image material 2, that is, the picture to be encoded is a P picture, then the encoder 27 sets the picture type of the picture to be encoded to a P picture at step S37. Thereafter, the processing advances to step S39 hereinafter described.

If it is decided at step S33 that the picture to be encoded is the nth or succeeding picture from the last in the display order, that is, the picture to be encoded is a picture corresponding to the B picture 72 or the B picture 73 shown in FIG. 9, then the encoder 27 sets the picture type of the picture to be encoded to a B picture at step S38.

After the processes at step S34, S36, S37 or S38 are ended, the encoder 27 decides at step S39 whether or not the process of the last picture is ended.

If it is decided at step S39 that the process of the last picture is not ended, then the processing returns to step S32 so that the processes at the steps beginning with step S32 are repeated. If it is decided conversely at step S39 that the process of the last picture is ended, then the processing is ended.

By such processing as described above, the picture type upon re-encoding can be determined in order to prevent the VBV buffer from breaking down when data of compressed material images of the Long Open GOP structure in the proximity of editing points are decoded and then spliced together at the editing points, whereafter the spliced data are re-encoded and spliced with compressed material image data which have not been re-encoded to edit the material images.

Figure 14:
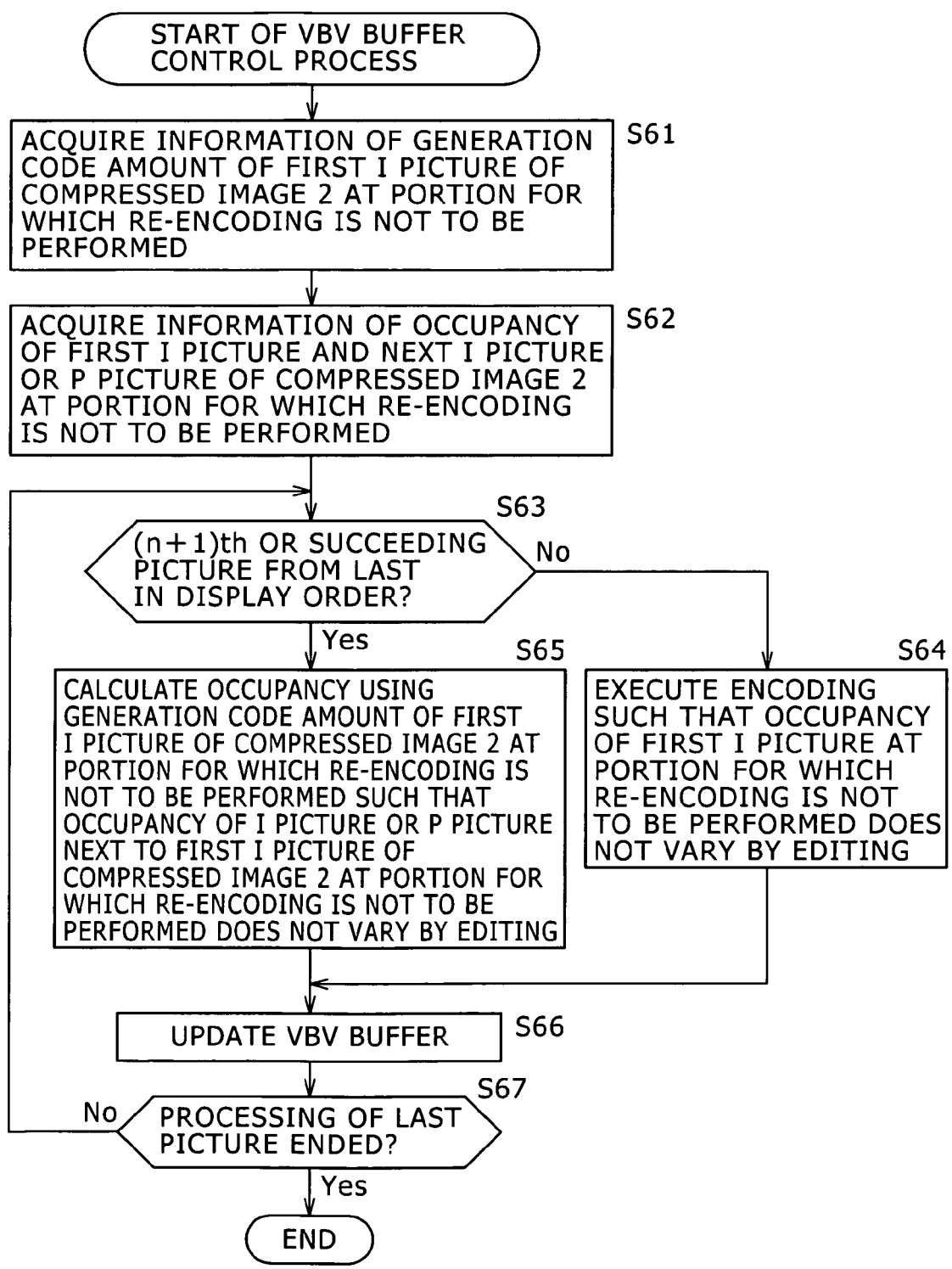
FIG. 14 is a flow chart illustrating a VBV buffer control process by the editing apparatus of FIG. 4.

Now, a VBV buffer control process when re-encoding is executed (process at step S7 of FIG. 12) is described with reference to a flow chart of FIG. 14.

At step S61, the CPU 20 acquires information of the generation code amount of the first I picture of the compressed material image 2 at a portion for which re-encoding is not to be performed, that is, information of the generation code amount of a portion denoted by B in FIG. 11.

At step S62, the CPU 20 acquires information of the occupancy of the first I picture and a next I picture or P picture of the compressed material image 2 at the portion for which re-encoding is not to be performed, that is, information of the occupancy of pictures denoted by B and C in FIG. 11. The CPU 20 controls the encoding process by the encoder 27 based on the information acquired at steps S61 and S62. The encoder 27 starts encoding of image material data, produced by splicing at editing points, supplied from the effect/switch 26 under the control of the CPU 20.

Figure 10:
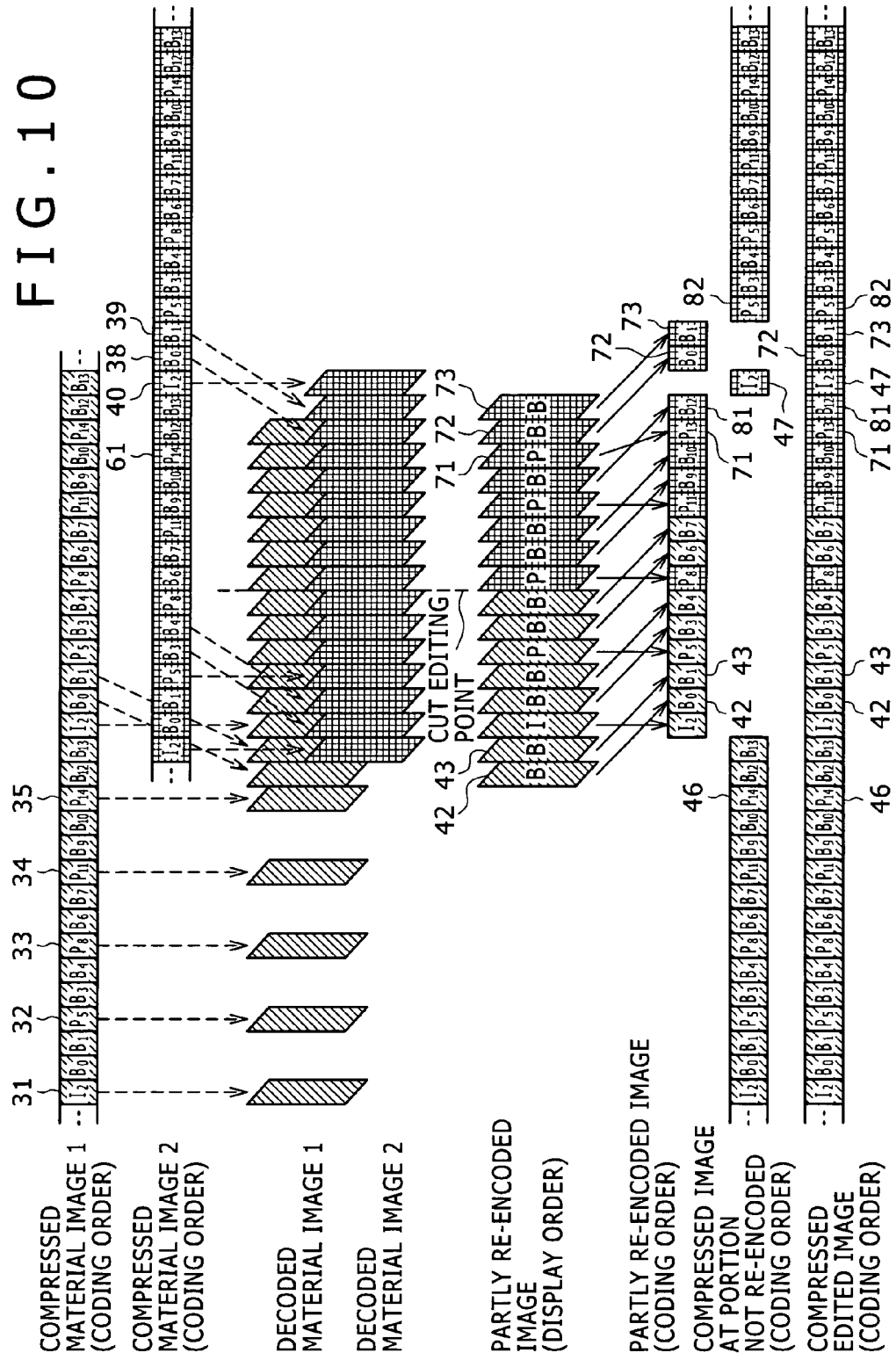
FIG. 10 is a diagrammatic view illustrating arrays of pictures in the display order in the partial re-encoding and editing processes illustrated in FIG. 9.

At step S63, the encoder 27 decides whether or not the picture to be encoded is the (n+1)th or succeeding picture from the last in the coding order, that is, whether or not the picture to be encoded is a picture corresponding to one of the I picture 47, B picture 72 and B picture 73 shown in FIG. 10.

If it is decided at step S63 that the picture to be encoded is not the (n+1)th or succeeding picture from the last in the coding order, then the encoder 27 executes encoding at step S64 so that the occupancy of the first I picture at the portion of the compressed material image 2 for which re-encoding is not to be performed does not vary by editing, that is, the occupancy of the picture denoted by B in FIG. 11 and the occupancy of the picture denoted by F in FIG. 11 may be the same before and after the editing. Thereafter, the processing advances to step S66 hereinafter described.

On the other hand, if it is decided at step S63 that the picture to be encoded is the (n+1)th or succeeding picture from the last in the coding order, then the encoder 27 uses the generation code amount of the first I picture of the compressed material image 2 at the portion for which re-encoding is not to be performed to calculate the occupancy so that the occupancy of an I picture or a P picture next to the first I picture of the compressed material image 2 at the portion for which re-encoding is not to be performed may not exhibit a variation before and after the editing, that is, the occupancy denoted by I in FIG. 11 and the occupancy denoted by J in FIG. 11 may not exhibit a variation before and after the editing to perform allocation of the generation code amount.

After the process at step S64 or S65 is ended, the encoder 27 updates, at step S66, the VBV buffer based on the allocation of the generation code amount by the process at step S64 or S65.

At step S67, the encoder 27 decides whether or not the process of the last picture is ended.

If it is decided at step S67 that the process of the last picture is not ended, then the processing returns to step S63 so that the processes at the steps beginning with step S63 are repeated. On the other hand, if it is decided at step S67 that the process of the last picture is ended, then the processing is ended.

By such processing as described above, the generation code amount can be controlled so that, when data of compressed material images of the Long Open GOP structure in the proximity of editing points are decoded and spliced together at the editing points, whereafter they are re-encoded and then spliced with compressed material image data, which have not been re-encoded, to edit the data, the VBV buffer may be prevented from breaking down.

Figure 12:
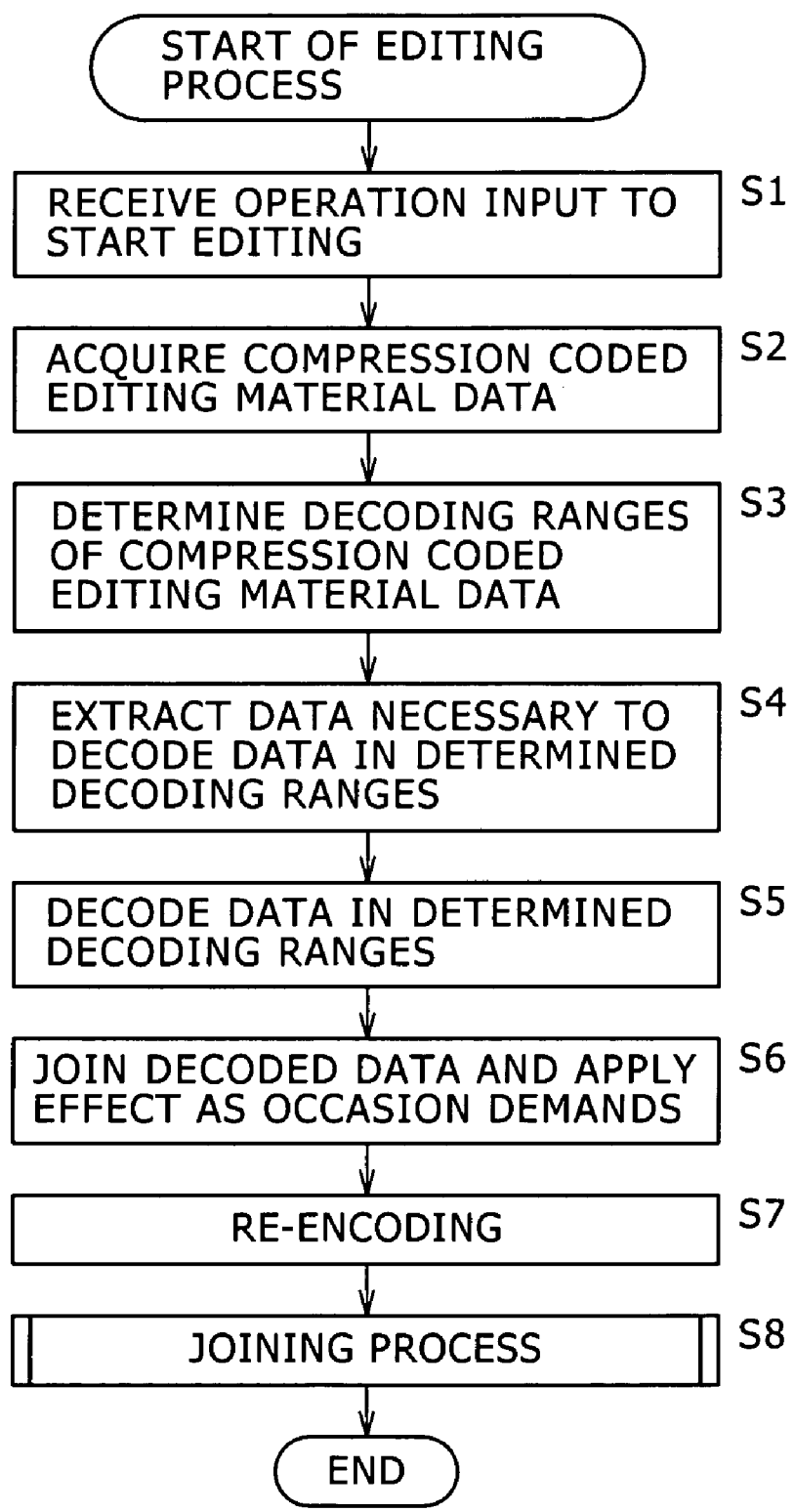
FIG. 12 is a flow chart illustrating an editing process by the editing apparatus of FIG. 4.
Figure 13:
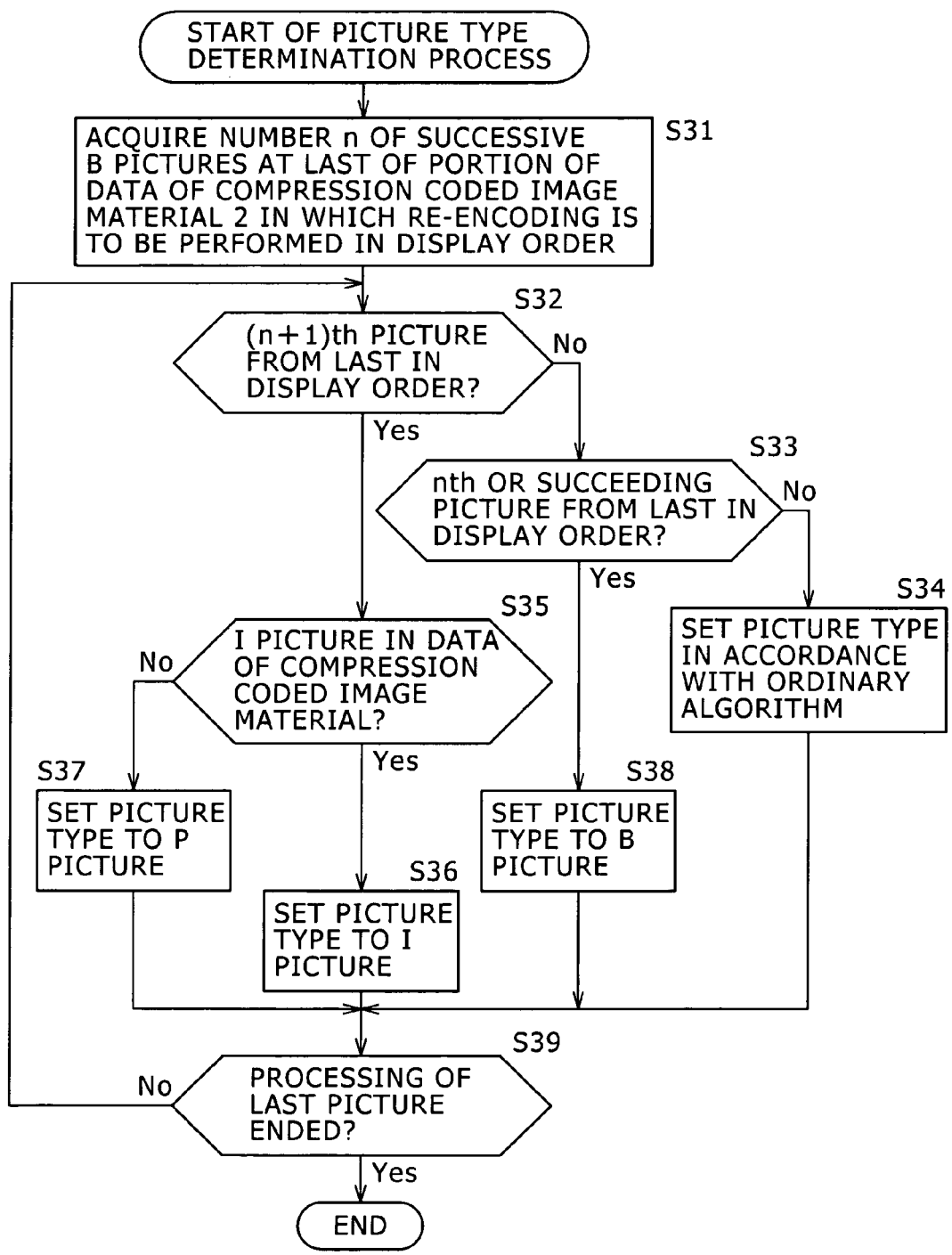
FIG. 13 is a flow chart illustrating a picture type determination process by the editing apparatus of FIG. 4.

Now, a splicing process executed at step S8 of FIG. 12 is described with reference to a flow chart of FIG. 15.

At step S91, the stream splicer 25 acquires data of the compressed material image 1, supplied from the PCI bridge 17, at a portion for which re-encoding is not to be performed, that is, data of those pictures preceding in time to the P picture 46 in the display order in the case of FIG. 9.

At step S92, the stream splicer 25 acquires re-encoded compressed image data in the proximity of editing points supplied thereto from the encoder 27, that is, in the case of FIG. 9, pictures corresponding to the P picture 41 and the I picture 74 in the display order.

At step S93, the stream splicer 25 discards compressed image data for reference in encoding from among the re-encoded compressed image data in the proximity of editing points, that is, in the case of FIG. 9, pictures corresponding to the P picture 41 and the I picture 74, and splices the data of the compressed material image 1 at the portion for which re-encoding is not performed and the re-encoded compressed image data each other. In particular, in the case of FIG. 9, the stream splicer 25 splices the P picture 46 with the B picture 42 together such that they are contiguous to each other in the display order.

At step S94, the stream splicer 25 acquires data of the compressed material image 2 at the portion, for which re-encoding is not performed, supplied from the PCI bridge 17, that is, in the case of FIG. 9, data of those pictures which are the $I_2$ picture 47 and succeeding pictures in time in the display order.

At step S95, the stream splicer 25 splices the first I picture in the display order of the compressed material image 2 at the portion for which re-encoding is not to be performed, that is, in the case of FIG. 10, a picture corresponding to the $I_2$ picture 47, with the next to the n+1th picture from the last of the re-encoded compressed image data in the proximity of the editing point, that is, in the case of FIG. 10, a picture corresponding to the $B_{12}$ picture 81.

At step S96, the stream splicer 25 splices n B pictures from the last of the re-encoded compressed image data in the proximity of the editing point, that is, in the case of FIG. 10, the $B_0$ picture 72 and the $B_1$ picture 73, with the first I picture in the coding order of the compressed material image 2 at the portion for which re-encoding is not performed, that is, in the case of FIG. 10, with a picture corresponding to the $I_2$ picture 47.

Then at step S97, the stream splicer 25 splices the second I or P picture of the compressed material image 2 at the portion for which re-encoding is not to be performed, that is, in the case of FIG. 10, the $P_5$ picture 82, with the next to the last B picture of the re-encoded compressed image data in the proximity of the editing point, that is, in the case of FIG. 10, with the next to the $B_1$ picture 73. Thereafter, the processing returns to step S8 of FIG. 12, whereafter the processing is ended.

By such processing as described above, when compressed material images of the Long Open GOP structure are to be edited, it is possible to control the generation code amount and splice compression coded data of a re-encoded portion whose picture type upon re-encoding is determined with compression coded data of a portion which is not re-encoded to each other so that the VBV buffer may not break down.

In this manner, by applying the present invention, in editing of a method wherein image materials compressed in accordance with the Long Open GOP system are partially decoded and re-encoded, the restriction condition to the VBV buffer can be satisfied without the necessity to apply a restriction to the compression method.

It is to be noted that, while it is described above that the picture type of pictures succeeding the n+1th picture from the last in the display order is controlled so that it may not exhibit a change before and after the editing, the present invention can be applied also to an alternative case wherein the picture type of pictures including a predetermined I picture or P picture within a range for which re-encoding is to be performed and pictures succeeding the predetermined I picture or P picture may not exhibit a variation before and after the editing.

While the series of processes described above can be executed by hardware, it may otherwise be executed by software. Where the series of processes is executed by software, a program which constructs the software is installed from a recording medium into a computer incorporated in hardware for exclusive use or, for example, a general purpose personal computer which can execute various functions by installing various programs. In this instance, for example, the editing apparatus 1 described hereinabove with reference to FIG. 4 is formed from such a personal computer 301 as shown in FIG. 16.

Figure 16:
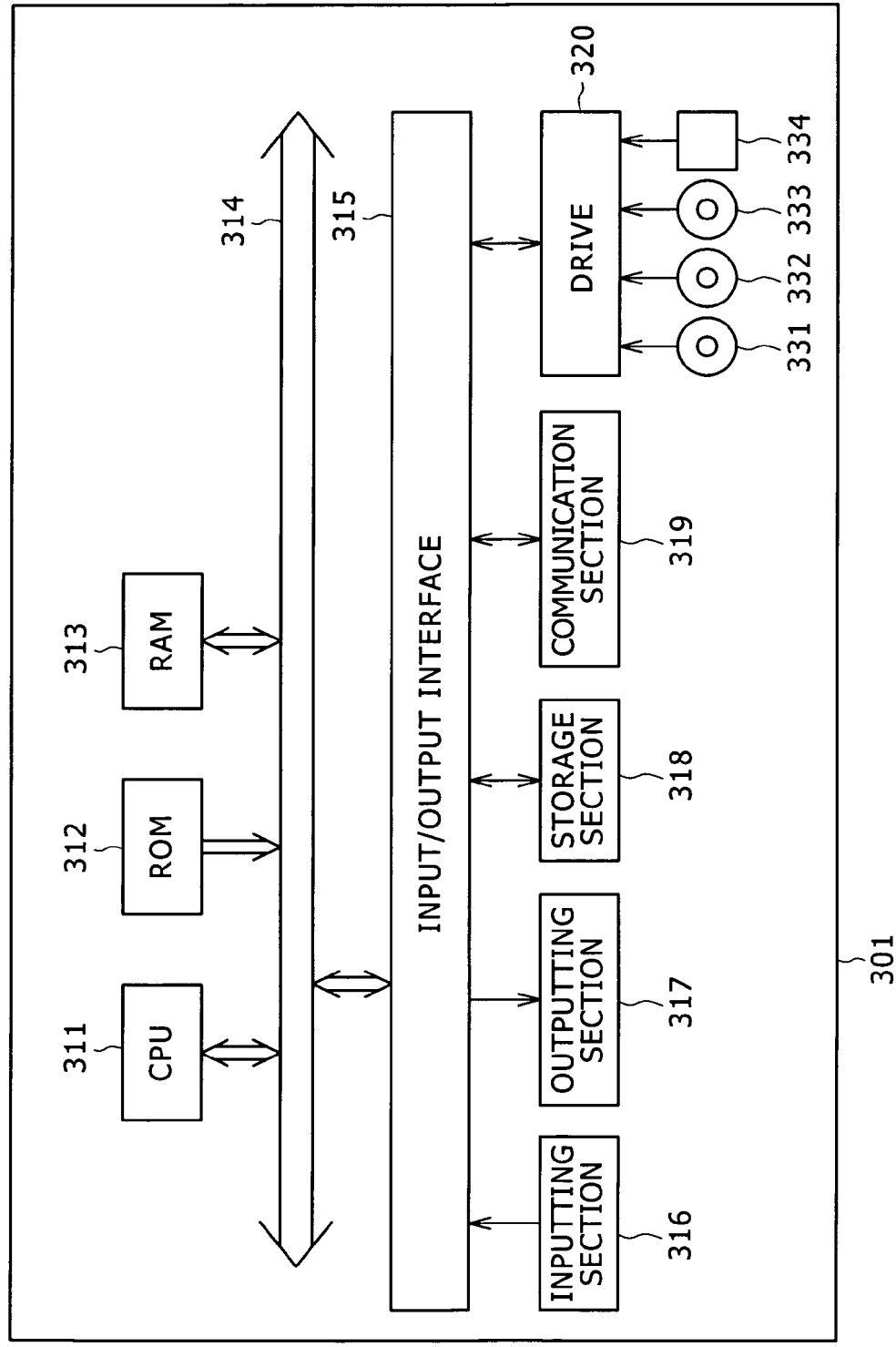
FIG. 16 is a block diagram showing a configuration of a personal computer.

Referring to FIG. 16, a central processing unit (CPU) 311 executes various processes in accordance with a program stored in a ROM (Read Only Memory) 312 or a program loaded from a storage section 318 into a RAM (Random Access Memory) 313. Also data necessary for the CPU 311 to execute the processes are suitably stored into the RAM 313.

The CPU 311, ROM 312 and RAM 313 are connected to one another by a bus 314. Also an input/output interface 315 is connected to the bus 314.

An inputting section 316 including a keyboard, a mouse and so forth, an outputting section 317 including a display unit, a speaker and so forth, a storage section 318 formed from a hard disk or the like, a communication section 319 including a modem, a terminal adapter and so forth are connected to the input/output interface 315. The communication section 319 performs a communication process through a network such as the Internet.

Further, as occasion demands, a drive 320 is connected to the input/output interface 315. A magnetic disk 331, an optical disk 332, a magneto-optical disk 333, a semiconductor memory 334 or the like is suitably loaded into the drive 320, and a computer program read from the loaded medium is installed into the storage section 318 as occasion demands.

The recording medium from which a program is installed as described above may be formed as a package medium such as, as shown in FIG. 16, a magnetic disk 331 (including a floppy disk), an optical disk 332 (including a CD-ROM (Compact Disc-Read Only Memory) and a DVD (Digital Versatile Disk)), or a magneto-optical disk 333 (including an MD (Mini Disk) (trademark)), or a semiconductor memory 334 which has the program recorded thereon or therein and is distributed to provide the program to a user separately from an apparatus body. Else, the recording medium is formed as a ROM 312, a hard disc included in the storage section 318 or the like in which the program is stored and which is provided to a user in a state wherein the program is incorporated in an apparatus body in advance.

Further, in the present specification, the steps which describe the program recorded in a recording medium may be but need not necessarily be processed in a time series in the order as described, and include processes which are executed in parallel or individually without being processed in a time series.

Figure 17:
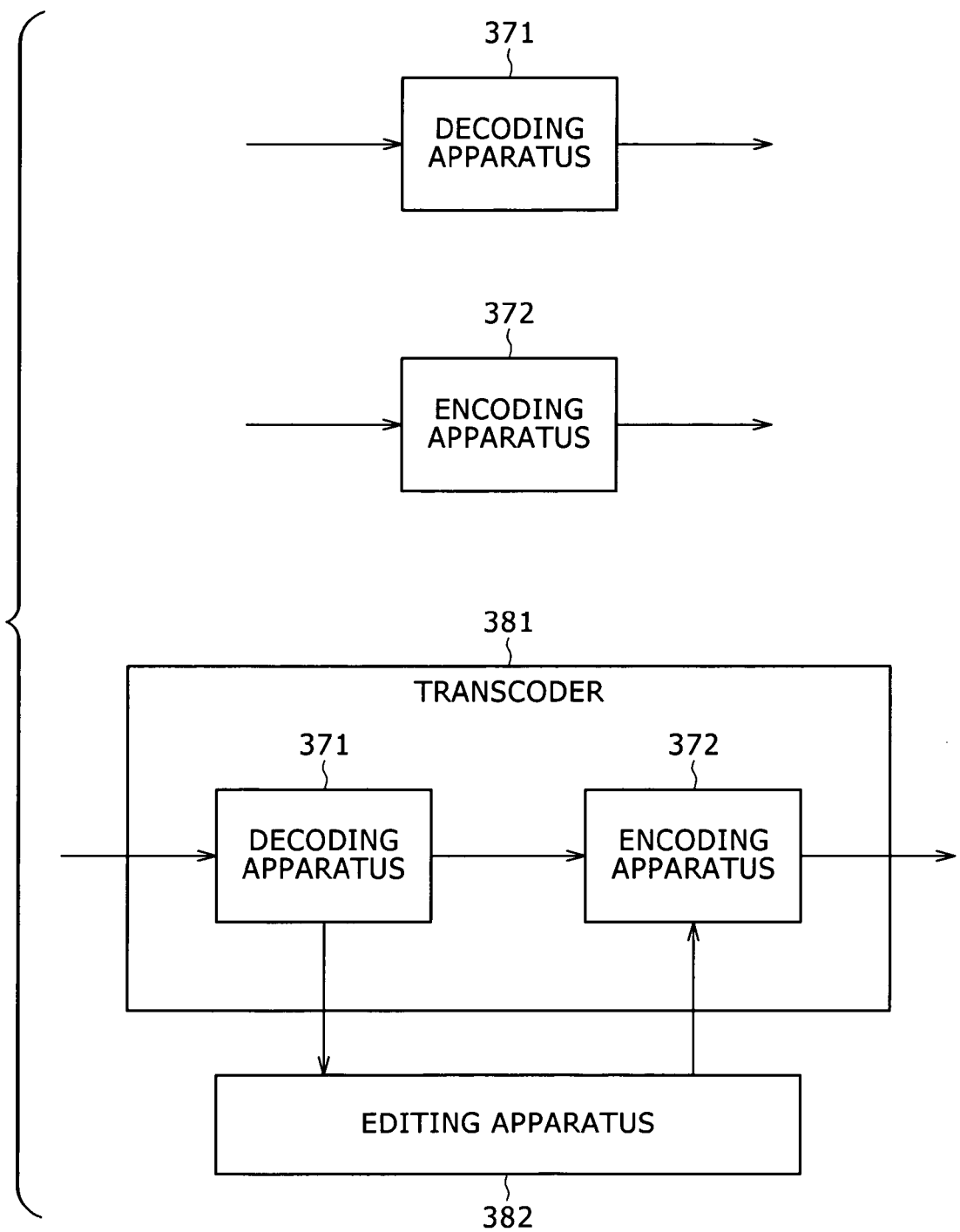
FIG. 17 is a block diagram showing a configuration of different apparatus to which the present invention can be applied.

It is to be noted that, while, in the embodiment described above, the editing apparatus 1 includes a decoder and an encoder, the present invention can be applied also where the decoder and the encoder are each formed as an independent apparatus. For example, as seen in FIG. 17, a decoding apparatus 371 for decoding and converting stream data into a base band signal and an encoding apparatus 372 for encoding and converting a base band signal into stream data may each be formed as an independent apparatus.

In this instance, the decoding apparatus 371 decodes compression coded data of an image material and supplies the decoded data to the encoding apparatus 372. Further, the decoding apparatus 371 can receive supply of compression coded data produced by partial encoding and editing by means of the encoding apparatus 372 by application of the present invention and perform a decoding process of the received compression coded data to convert the data into a base band signal. The stream after editing converted into the base band signal is, for example, supplied to and displayed on a predetermined display apparatus or outputted to another apparatus so that necessary processing may be applied by the apparatus.

Further, the present invention can be applied also where the decoders 22 to 24 in the embodiment described above do not completely decode compression coded data supplied thereto and the corresponding encoder 27 partly encodes the corresponding portion of the data which has been decoded but incompletely.

For example, if the decoders 22 to 24 perform decoding and dequantization only for VLC codes but do not execute inverse DCT transform, then the encoder 27 performs quantization and variable length encoding processes but does not perform a DCT transform process. The present invention can naturally be applied also to an encoder which performs such partial encoding (encoding from an intermediate stage) as just described.

Furthermore, the present invention can be applied also where a base band signal decoded completely by the decoders 22 to 24 is encoded to an intermediate stage by the encoder 27 (for example, although DCT transform and quantization are preformed, a variable length coding processing is not performed) or where, since the decoders 22 to 24 do not perform decoding completely (for example, only decoding and dequantization for VLC codes are performed, but inverse DCT transform is not executed), data encoded to an intermediate stage are further encoded to another intermediate stage by the encoder 27 (for example, although quantization is performed, a variable length coding process is not performed).

Further, the present invention can be applied also where the decoding apparatus 371 shown in FIG. 17 does not completely decode stream data supplied thereto and the corresponding encoding apparatus 372 partially encodes the corresponding portion of the data decoded but incompletely.

For example, when the decoding apparatus 371 performs only decoding and dequantization for VLC codes but does not execute inverse DCT transform, the decoding apparatus 371 performs quantization and variable length coding processes but does not perform a DCT transform process. Naturally, the present invention can be applied also to the decoding process of the decoding apparatus 371 which performs such a partial decoding process (decoding to an intermediate stage) and the encoding process of the encoding apparatus 372 which performs encoding (encoding from the intermediate stage).

Furthermore, the present invention can be applied also where a base band signal decoded completely by the decoding apparatus 371 is encoded to an intermediate stage by the encoding apparatus 372 (for example, although DCT transform and quantization are preformed, a variable length coding processing is not performed) or where, since the decoding apparatus 371 does not perform decoding completely (for example, only decoding and dequantization for VLC codes are performed, but inverse DCT transform is not executed), data encoded to an intermediate stage are further encoded to another intermediate stage by the encoding apparatus 372 (for example, although quantization is performed, a variable length coding process is not performed).

Further, the present invention can be applied also to a transcoder 381 formed from a decoding apparatus 371 which performs such partial decoding (executes part of the step of the decoding process) and an encoding apparatus 372 which performs partial encoding (executes part of the step of an encoding process). Such a transcoder 381 as just described is used where an editing apparatus 382 which performs editing such as, for example, splicing, that is, an editing apparatus which has functions which can be executed by the stream splicer 25 or the effect/switch 26 of the editing apparatus 1 described hereinabove.

Furthermore, while, in the embodiment described hereinabove, the CPU 11 and the CPU 20 are formed in separate elements, they may otherwise be formed as a single CPU which controls the entire editing apparatus 1. Similarly, while, in the embodiment described above, the memory 13 and the memory 21 are formed in separate elements, they may otherwise be formed as a single memory in the editing apparatus 1.

Further, while, in the embodiment described hereinabove, the HDD 16, decoders 22 to 24, stream splicer 25, effect/switch 26 and encoder 27 are connected to one another through bridges and buses so as to be integrated as an editing apparatus, the present invention is not limited to this, but, for example, some of the components mentioned may be connected from the outside by a wire or by radio. Further, the components mentioned may otherwise be connected to one another in any of various connection schemes.

Furthermore, while, in the embodiment described above, compressed materials for editing are stored in a HDD, the present invention is not limited to this, but can be applied also where an editing process is performed using a material for editing recorded on various recording media such as, for example, an optical disk, a magneto-optical disk, a semiconductor memory and a magnetic disk.

Further, the decoders 22 to 24, stream splicer 25, effect/switch 26 and encoder 27 may be carried on the same extension card (for example, a PCI card, a PCI-Express card or the like). However, where the transfer rate between different cards is high owing to a technique of, for example, the PCI-Express, they may otherwise be carried on separate extension cards.

The present invention can be applied not only to information processing apparatus of the MPEG system, but also to information processing apparatus of the type which use an encoding or decoding algorithm similar to that of the MPEG system.

While a preferred embodiment of the present invention has been described using specific terms, such description is for illustrative purpose only, and it is to be understood that changes and variations may be made without departing from the spirit or scope of the following claims.

What is claimed is:

1. An information processing apparatus for splicing first compressed image data with second compressed image data, the apparatus comprising:

decoding means for decoding a first predetermined section including a first editing point set to the first compressed image data to produce first image data and decoding a second predetermined section including a second editing point set to the second compressed image data to produce second image data;

re-encoding means for splicing the first and second image data to each other at the first editing point and the second editing point and re-encoding the resulting image data to produce re-encoded image data;

control means for controlling the re-encoding process of said re-encoding means so that a picture type of each picture in the re-encoded image data that is positioned later in time in a display order than an I picture or a P picture is the same as a picture type of a corresponding picture of the first compressed image data and the second compressed image data; and editing means for switchably outputting the first and second compressed image data and the re-encoded image data produced by said re-encoding means to produce edited compressed image data, wherein the control means controls the re-encoding process of said re-encoding means so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

2. The information processing apparatus according to claim 1, wherein said control means controls the re-encoding process of said re-encoding means so that a picture type of a picture in the re-encoded image data that is positioned later than an I picture or a P picture that is positioned latest in time in the display order is the same as a picture type of a corresponding picture of the first compressed image data and the second compressed image data.

3. The information processing apparatus according to claim 1, wherein said decoding means determines the first and second predetermined sections so that a first picture, which is a top picture of the second compressed image data that is not included in the second predetermined section, is an I picture.

4. The information processing apparatus according to claim 3, wherein said control means acquires information of a generation code amount of the first picture and acquires information regarding the occupancy of a second picture, which is an I picture or a P picture positioned second in time in the display order from among the second compressed image data that is not included in the second predetermined range, and controls the re-encoding process of said re-encoding means so that an occupancy of a third picture, which is an I picture or a P picture positioned next to the first picture from among the edited compressed image data produced by said editing means, is equal to an occupancy of the second picture.

5. The information processing apparatus according to claim 3, wherein said control means controls said editing means and controls the production of the edited compressed image data by said editing means so that the first picture is disposed prior to B pictures that are positioned successively at the last of the compressed image data in a coding order.

6. An information processing method for splicing first compressed image data with second compressed image data, the method comprising:

decoding a first predetermined section including a first editing point set to the first compressed image data to produce first image data and decoding a second predetermined section including a second editing point set to the second compressed image data to produce second image data;

splicing the first and second image data to each other at the first editing point and the second editing point and re-encoding the resulting image data to produce re-encoded image data;

controlling the splicing step so that a picture type of each picture in the re-encoded image data that is positioned later in time in a display order than an I picture or a P picture is the same as a picture type of a corresponding picture of the first compressed image data and the second compressed image data; and switchably outputting the first and second compressed image data and the re-encoded image data produced at the splicing step to produce edited compressed image data, wherein controlling the splicing step so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

7. A computer readable medium including computer executable instructions, wherein the instructions, when executed by a processor, cause the processor to perform a method of splicing first compressed image data with second compressed image data comprising:

decoding a first predetermined section including a first editing point set to the first compressed image data to produce first image data and decoding a second predetermined section including a second editing point set to the second compressed image data to produce second image data;

splicing the first and second image data to each other at the first editing point and the second editing point and re-encoding the resulting image data to produce re-encoded image data;

controlling the splicing step so that a picture type of each picture in the re-encoded image data that is positioned later in time in a display order than an I picture or a P picture is the same as a picture type of a corresponding picture of the first compressed image data and the second compressed image data; and switchably outputting the first and second compressed image data and the re-encoded image data produced at the splicing step to produce edited compressed image data, wherein controlling the splicing step so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

8. An information processing apparatus for splicing first compressed image data with second compressed image data to produce edited compressed image data, the apparatus comprising:

decoding means for decoding a first predetermined section including a first editing point set to the first compressed image data to produce first image data and decoding a second predetermined section including a second editing point set to the second compressed image data to produce second image data;

re-encoding means for splicing the first and second image data to each other at the first editing point and the second editing point and re-encoding the resulting image data to produce re-encoded image data; and control means for controlling the re-encoding process of said re-encoding means so that a picture type of each picture in the re-encoded image data that is positioned later in time in a display order than an I picture or a P picture is the same as a picture type of a corresponding picture of the first compressed image data and the second compressed image data, wherein the control means controls the re-encoding process of said re-encoding means so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

9. An information processing method for splicing first compressed image data with second compressed image data to produce edited compressed image data, the method comprising:

decoding a first predetermined section including a first editing point set to the first compressed image data to produce first image data and decoding a second predetermined section including a second editing point set to the second compressed image data to produce second image data;

splicing the first and second image data to each other at the first editing point and the second editing point and re-encoding the resulting image data to produce re-encoded image data; and controlling the re-encoding process at the re-encoding step so that a picture type of each picture in the re-encoded image data that is positioned later in time in a display order than an I picture or a P picture is the same as a picture type of a corresponding picture of the first compressed image data and the second compressed image data, wherein controlling the splicing step so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

10. An information processing apparatus for splicing first compressed image data with second compressed image data, comprising:

re-encoding means for splicing first image data obtained by decoding a first predetermined section including a first editing point set to the first compressed image data and second image data produced by decoding a second predetermined section including a second editing point set to the second compressed image data to each other at the first editing point and the second editing point and re-encoding the resulting image data to produce re-encoded image data; and control means for controlling the re-encoding process of said re-encoding means so that a picture type of each picture in the re-encoded image data that is positioned later in time in a display order than an I picture or a P picture is the same as a picture type of a corresponding picture of the first compressed image data and the second compressed image data, wherein the control means controls the re-encoding process of said re-encoding means so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

11. An information processing method for splicing first compressed image data with second compressed image data, the method comprising:

splicing first image data obtained by decoding a first predetermined section including a first editing point set to the first compressed image data with second image data produced by decoding a second predetermined section including a second editing point set to the second compressed image data to each other at the first editing point and the second editing point and re-encoding the resulting image data to produce re-encoded image data; and controlling the splicing step so that a picture type of each picture in the re-encoded image data that is positioned later in time in a display order than an I picture or a P picture is the same as a picture type of a corresponding picture of the first compressed image data and the second compressed image data, wherein controlling the splicing step so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

12. An information processing apparatus for splicing first compressed image data with second compressed image data, the apparatus comprising:

a decoding section configured to decode a first predetermined section including a first editing point set to the first compressed image data to produce first image data and configured to decode a second predetermined section including a second editing point set to the second compressed image data to produce second image data;

a re-encoding section configured to splice the first and second image data to each other at the first editing point and the second editing point and re-encoding the resulting image data to produce re-encoded image data;

a control section configured to control the re-encoding process of said re-encoding section so that a picture type of each picture in the re-encoded image data that is positioned later in time in a display order than an I picture or a P picture is the same as a picture type of a corresponding picture of the first compressed image data and the second compressed image data; and an editing section configured to switchably output the first and second compressed image data and the re-encoded image data produced by said re-encoding section to produce edited compressed image data, wherein the control section controls the re-encoding process of said re-encoding section so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

13. An information processing apparatus for splicing first compressed image data with second compressed image data to produce edited compressed image data, comprising:

a decoding section configured to decode a first predetermined section including a first editing point set to the first compressed image data to produce first image data and configured to decode a second predetermined section including a second editing point set to the second compressed image data to produce second image data;

a re-encoding section configured to splice the first and second image data to each other at the first editing point and the second editing point and re-encoding the resulting image data to produce re-encoded image data; and a control section configured to control the re-encoding process of said re-encoding section so that a picture type of each picture in the re-encoded image data that is positioned later in time in a display order than an I picture or a P picture is the same as a picture type of a corresponding picture of the first compressed image data and the second compressed image data, wherein the control section controls the re-encoding section so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

14. An information processing apparatus for splicing first compressed image data with second compressed image data to produce edited compressed image data, comprising:

a re-encoding section configured to splice first image data obtained by decoding a first predetermined section including a first editing point set to the first compressed image data with second image data produced by decoding a second predetermined section including a second editing point set to the second compressed image data to each other at the first editing point and the second editing point and configured to re-encode the resulting image data to produce re-encoded image data; and a control section configured to control the re-encoding process of said re-encoding section so that a picture type of each picture in the re-encoded image data that is positioned later in time in a display order than an I picture or a P picture is the same as a picture type of a corresponding picture of the first compressed image data and the second compressed image data, wherein the control section controls the re-encoding section so that a buffer occupancy of a first I or P picture that follows a top I picture of the second compressed image data is the same as a buffer occupancy of a first I or P picture that follows a top I picture of the edited compressed image data, the top I picture of the second compressed image data is a first I picture that follows the second predetermined section in the second compressed image data, and the top I picture of the edited compressed image data is an I picture that corresponds to the top I picture of the second compressed image data.

* * * * *